(12) United States Patent
Sekiguchi et al.

(10) Patent No.: US 7,848,196 B2
(45) Date of Patent: Dec. 7, 2010

(54) POWER DETERMINING METHOD, SINGLE-SIDED MULTILAYER OPTICAL DISK, RECORDING METHOD, COMPUTER PROGRAM PRODUCT, COMPUTER-READABLE MEDIUM, AND OPTICAL DISK APPARATUS

(75) Inventors: Hiroyoshi Sekiguchi, Kanagawa (JP); Michiaki Shinotsuka, Kanagawa (JP); Masaru Shinkai, Kanagawa (JP); Eiko Hibino, Kanagawa (JP); Masaki Kato, Kanagawa (JP); Katsuyuki Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 669 days.

(21) Appl. No.: 11/791,362

(22) PCT Filed: May 18, 2006

(86) PCT No.: PCT/JP2006/310417

§ 371 (c)(1),
(2), (4) Date: May 23, 2007

(87) PCT Pub. No.: WO2007/043210

PCT Pub. Date: Apr. 19, 2007

(65) Prior Publication Data

US 2008/0084800 A1    Apr. 10, 2008

(30) Foreign Application Priority Data

Sep. 30, 2005  (JP) ............................... 2005-285715
Nov. 24, 2005  (JP) ............................... 2005-338801
Dec. 19, 2005  (JP) ............................... 2005-364190

(51) Int. Cl.
*G11B 7/12* (2006.01)

(52) U.S. Cl. ................ 369/47.53; 369/47.5; 369/53.27; 369/94; 369/116

(58) Field of Classification Search ................ 369/47.5, 369/47.53, 53.27, 94, 116
See application file for complete search history.

(56) References Cited

U.S. PATENT DOCUMENTS

| 5,872,763 A | 2/1999 | Osakabe |
| 6,031,803 A * | 2/2000 | Kubota et al. ............. 369/53.26 |
| 7,529,165 B2 * | 5/2009 | Ushiyama et al. ......... 369/47.53 |
| 2002/0110066 A1 | 8/2002 | Mashimo et al. |
| 2005/0073930 A1 * | 4/2005 | Lee et al. .................. 369/59.11 |
| 2005/0089798 A1 * | 4/2005 | Miura et al. ............ 430/270.11 |
| 2005/0163011 A1 * | 7/2005 | Miura et al. ............. 369/59.11 |
| 2007/0121461 A1 * | 5/2007 | Kobayashi et al. ....... 369/59.11 |

FOREIGN PATENT DOCUMENTS

| EP | 1 365 392 | 11/2003 |
| EP | 1 475 785 | 11/2004 |
| EP | 1 484 751 | 12/2004 |
| JP | 09-138946 | 5/1997 |
| JP | 10-064064 | 3/1998 |

(Continued)

*Primary Examiner*—Wayne R Young
*Assistant Examiner*—Brenda Bernardi
(74) *Attorney, Agent, or Firm*—Dickstein Shapiro LLP

(57) ABSTRACT

A power determining method is disclosed for determining the light emitting power of a light source upon recording information on an optical disk having plural rewritable recording layers, the method involving obtaining an optimum erasing power with respect to an optimum recording power by recording test data on the optical disk.

11 Claims, 28 Drawing Sheets

FOREIGN PATENT DOCUMENTS

| | | |
|---|---|---|
| JP | 2000-251256 | 9/2000 |
| JP | 2004-273074 | 9/2004 |
| JP | 2005-190643 | 7/2005 |
| KR | EP-1365392 A * | 11/2002 |
| WO | WO 2005/104101 | 11/2005 |

* cited by examiner

MODULATION LEVEL=(I14H−I14L)/I14H

ASYMMETRY=(I14H+I14L−I3H−I3L)/2(I14H−I14L)

POWER DETERMINING METHOD, SINGLE-SIDED MULTILAYER OPTICAL DISK, RECORDING METHOD, COMPUTER PROGRAM PRODUCT, COMPUTER-READABLE MEDIUM, AND OPTICAL DISK APPARATUS

TECHNICAL FIELD

The present invention relates to a power determining method for determining the light emitting power of a laser beam for recording information on an optical disk having plural rewritable recording layers, a single-sided multilayer optical disk to which the power determining method may be applied, a recording method and an optical disk apparatus for recording information on an optical disk using the light emitting power determined by the power determining method, a power determining program used in the optical disk apparatus, a computer-readable medium that stores such a program, and a computer program product including such a computer-readable medium.

BACKGROUND ART

In recent years and continuing, with the development of digital technology and data compression technology, optical disks such as the CD (compact disk) and the DVD (digital versatile disk) are commonly being applied as media for recording information such as music, photographs, and computer software, for example (referred to as 'contents'). Also, with the decrease in price of such optical disks, optical disk apparatuses configured to record information on such optical disks are becoming increasingly popular.

An optical disk apparatus may be configured to record/erase information on/from an optical disk having a spiral track or concentric tracks formed thereon by irradiating a laser beam emitted from a light source and forming microscopic spots on a recording layer of the optical disk. The optical disk apparatus may also be configured to reproduce information based on light reflected from the recording layer. The optical disk apparatus may include an objective lens, an optical system for guiding a light flux irradiated from the light source to the recording layer and guiding a reflected light flux that is reflected from the recording layer to a predetermined light receiving position, and an optical pickup device including an optical detector that is disposed at the light receiving position, for example.

Information may be recorded on an optical disk based on the lengths of mark/space areas having differing reflection rates and combinations thereof. Upon recording information on an optical disk using an optical disk apparatus, the light emitting power of the light source of the optical disk apparatus is controlled to enable a mark area and a space area to be formed at predetermined positions on a recording layer of the optical disk.

For example, in the case of recording information on a rewritable optical disk such as the CD-RW (CD-rewritable), the DVD-RW (DVD-rewritable), or the DVD+RW (DVD+rewritable) that includes special alloy in the recording layer as recording material, a mark area is formed by creating an amorphous state through heating the special alloy to a first temperature and rapidly cooling the special alloy thereafter. On the other hand, a space area is formed by creating a crystallized state through heating the special alloy to a second temperature (<first temperature) and gradually cooling the special alloy thereafter. In this way, the mark area is arranged to have a reflectance rate that is lower than that of the space area. The temperature control of the special alloy as is described above may be realized by controlling the light emitting power of the light source. Upon creating the mark area, the light emitting power may be arranged into plural pulses in order to hinder influences from heat accumulation. Such a method of controlling the light emitting power is referred to as the multi-pulse recording method. Also, the maximum value of the multi-pulse light emitting power is referred to as the recording power, and the minimum value of the multi-pulse light emitting power is referred to as the bias power. Also, the light emitting power for creating the space area is referred to as the erasing power (recording power>erasing power>bias power).

In the optical disk apparatus, before recording information on an optical disk, test writing is performed on a predetermined test writing area, referred to as PCA (Power Calibration Area), to obtain the optimum recording power so that a mark and a space may be formed on the optical disk at desired positions with desired lengths (e.g., see Japanese Patent No. 3259642, Japanese Patent No. 3124721, and Japanese Laid-Open Patent Publication No. 2005-190643). Such a process is referred to as an OPC (Optimum Power Control) process.

It is noted that in recent years and continuing, the amount of contents being recorded on an optical disk is increasing, and in turn, there is a growing demand for an optical disk with increased recording capacity. In this respect, an optical disk that is arranged to have light irradiated thereon from one side and includes plural recording layers is being developed (referred to as 'single-sided multilayer optical disk' hereinafter) as one way of increasing the recording capacity of the optical disk, and an optical disk apparatus configured to perform processes on such a single-sided multilayer optical disk is also being developed.

It is noted that in the single-sided multilayer optical disk, the light emitting power has to be controlled with greater accuracy. With the growing demand for higher recording speed, it is expected that a recording operation capable of stably recording information on a single-sided multilayer optical disk with good recording quality may not be realized based on the optimum recording power obtained through conventional power determining methods such as those disclosed in Japanese Patent No. 3259642, Japanese Patent No. 3124721, or Japanese Laid-Open Patent Publication No. 2005-190643, for example.

DISCLOSURE OF THE INVENTION

The present invention has been conceived in response to one or more of the problems described above, and it provides a power determining method for determining a suitable light emitting power of a light source upon recording information on an optical disk having plural rewritable recording layers.

The present invention also provides a recording method and an optical disk apparatus for stably performing high quality recording on an optical disk having plural rewritable recording layers.

The present invention also provides a power determining program that is executed by a control computer of an optical disk apparatus and is configured to enable high quality recording to be stably performed on an optical disk having plural rewritable recording layers, a computer-readable medium storing such a program, and a computer program product including such a computer-readable medium.

The present invention also provides a single-sided multilayer optical disk to which the power determining method of the present invention may be applied.

According to one embodiment of the present invention, a power determining method is provided for determining the light emitting power of a light source upon recording information on an optical disk having plural rewritable recording layers, the method including a step of:

obtaining an optimum erasing power with respect to an optimum recording power by recording test data on the optical disk.

According to one aspect of the present embodiment, upon recording information on an optical disk having plural rewritable recording layers, test data are recorded on the optical disk and an optimum erasing power with respect to an optimum recording power is obtained. More specifically, both an optimum recording power and an optimum erasing power for recording information on the optical disk are determined. Accordingly, a suitable light emitting power may be determined for recording information on an optical disk having plural rewritable recording layers.

According to another embodiment of the present invention, a recording method is provided for recording information on an optical disk having plural rewritable recording layers, the recording method including a step of recording information on the optical disk using the optimum erasing power obtained by the power determining method according to an embodiment of the present invention.

According to one aspect of the present embodiment, information may be recorded on the optical disk under optimum recording conditions, and thereby, high quality recording may be stably performed on the optical disk having plural rewritable recording layers.

According to another aspect of the present embodiment, a computer program product is provided that includes a computer-readable medium storing a computer-executable program executed by a control computer of an optical disk apparatus configured to record information on an optical disk having plural rewritable recording layers, the program being executed by the control computer to perform a step of obtaining an optimum erasing power with respect to an optimum recording power by recording test data on the optical disk.

According to an aspect of the present embodiment, when a power determining program according to an embodiment of the present invention is loaded in a predetermined memory and a start address of the program is set to a program counter, a control computer of the optical disk apparatus according to an embodiment of the present invention may record test data on an optical disk to obtain an optimum erasing power with respect to an optimum recording power for recording information on the optical disk. Specifically, the program according to the present embodiment may control the control computer of the optical disk apparatus to execute the power determining method according to an embodiment of the present invention. Accordingly, high quality recording may be stably performed on the optical disk having plural rewritable recording layers.

According to another aspect of the present embodiment, a computer-readable medium storing the program according to an embodiment of the present invention is provided.

According to an aspect of the present embodiment, the power determining program is stored in a computer-readable medium to be executed by a computer so that high quality recording can be performed on an optical disk having plural rewritable recording layers.

According to another embodiment of the present invention, an optical disk apparatus is provided that is configured to record information on an optical disk having plural rewritable recording layers, the apparatus including:

an optimum power obtaining unit configured to record test data on the optical disk and obtain an optimum erasing power with respect to an optimum recording power; and a recording unit configured to record information on the optical disk using the optimum erasing power obtained by the optimum power obtaining unit.

According to one aspect of the present embodiment, the optimum power obtaining unit is configured to obtain the optimum erasing power with respect to an optimum recording power for recording information on an optical disk having plural rewritable recording layers, and in turn, the recording unit may stably perform high quality recording on the optical disk.

According to another embodiment of the present invention, a single-sided multilayer optical disk is provided that includes plural rewritable recording layers;

wherein setting value information is preformatted in at least one of the recording layers, the setting value information being used for obtaining the optimum erasing power in the power determining method according to an embodiment of the present invention.

BRIEF DESCRIPTION OF THE DRAWINGS

Other objects, features and advantages of the present invention will become more apparent from the following detailed descriptions when read in conjunction with the accompanying drawings.

BEST MODE FOR CARRYING OUT THE INVENTION

In the following, preferred embodiments of the present invention are described with reference to the accompanying drawings.

Figure 1:
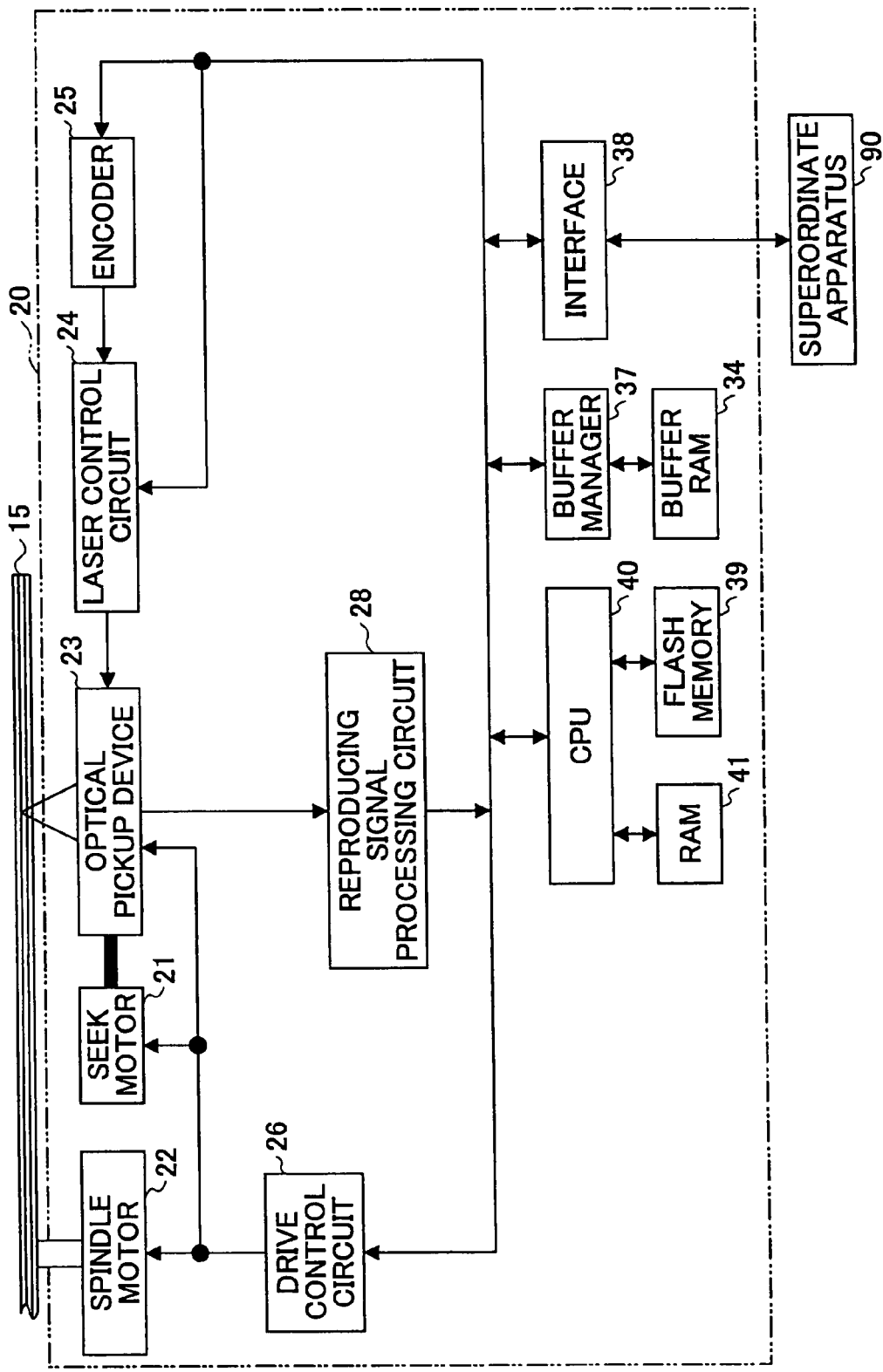
FIG. 1 is a block diagram showing a configuration of an optical disk apparatus according to one embodiment of the present invention.

FIG. 1 is a block diagram showing a configuration of an optical disk 20 according to an embodiment of the present invention.

The optical disk apparatus 20 as is shown in FIG. 1 includes a spindle motor 22 for rotating an optical disk 15 as a single-sided multilayer optical disk according to one embodiment of the present invention, an optical pickup device 23, a seek motor 21 for driving the optical pickup device 23 in a sledge direction, a laser control circuit 24, an encoder 25, a drive control circuit 26, a reproducing signal processing circuit 28, a buffer RAM 34, a buffer manager 37, an interface 38, a flash memory 39, a CPU 40, and a RAM 41, for example. It is noted that arrows shown in FIG. 1 illustrate representative flow directions of signals and information; however, connections between the block components shown in FIG. 1 are not limited to those represented by the arrows being shown. Also, it is assumed that the optical disk apparatus 20 of the present embodiment is adapted for a single-sided multilayer optical disk.

Figure 2:
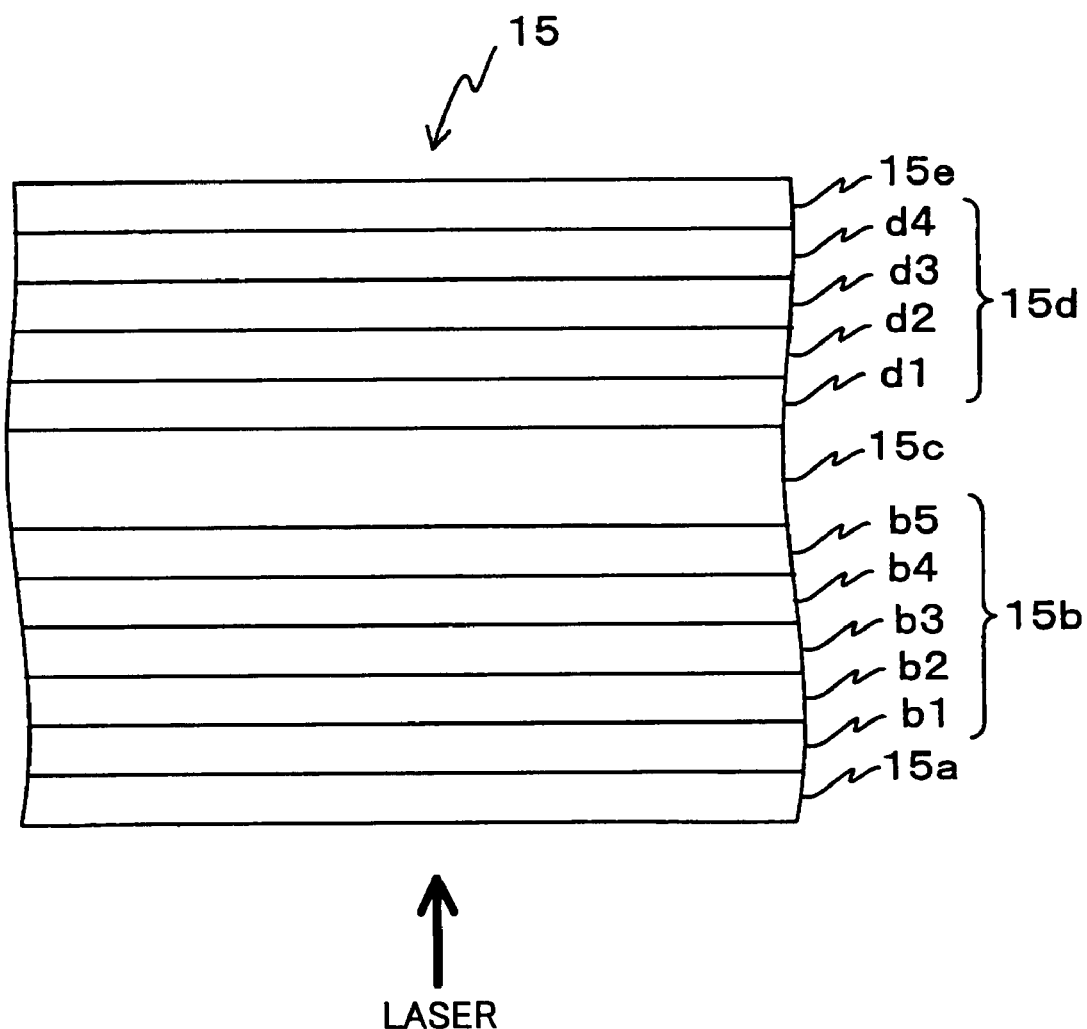
FIG. 2 is a cross-sectional diagram of a single-sided multilayer optical disk according to one embodiment of the present invention.

The optical disk 15 shown in FIG. 1 is a rewritable single-sided two-layer optical disk (referred to as 'two-layer phase change type optical disk' hereinafter). In one example, the optical disk 15 may include a first substrate 15a, a first information layer 15b, an intermediate layer 15c, a second information layer 15d, and a second substrate 15e as is shown in FIG. 2. In the following descriptions, it is assumed that the optical disk 15 is a DVD type information recording medium; however the present invention by no means limited to such type of optical disk.

As is shown in FIG. 2, the first information layer 15b includes a first lower protective layer b1, a first recording layer b2, a first upper protective layer b3, a first reflective layer b4, and a heat diffusion layer b5 that are arranged in this order from the first-substrate 15a side to the intermediate layer 15c side. The second information layer 15d includes a second lower protective layer d1, a second recording layer d2, a second upper protective layer d3, and a second reflective layer d4 that are arranged in this order from the intermediate layer 15c side to the second substrate 15e side.

It is noted that in the single-sided multilayer optical disk, an information layer other than that disposed furthest from the laser beam irradiating side is preferably arranged to have high permeability, and measures are being taken to reduce the absorption of light at the metal layer and to reduce the thickness of the recording layer. As a result, heat dissipation may not be adequately realized at the information layer other than that disposed furthest from the laser beam irradiating side. In turn, when the crystallization speed of the recording material is fast, it may be difficult to form a mark by creating an amorphous state at the recording material. In view of such a problem, a eutectic composition of Sb (antimony) and Te (tellurium) containing Sb at approximately 70% is preferably used as the recording material of the information layer other than the furthermost layer. For example, Ge—Sb—Te, In—Sb—Te, Ag—In—Sb—Te, Ge—In—Sb—Te, Ge—Sn—Sb—Te, or Ag—In—Ge—Sb—Te may be used as the recording material. Also, Ge—Te, In—Sb, Ga—Sb, or Ge—Sb may be used, for example.

The first recording layer b2 preferably has a thickness of 4-12 nm. When the thickness of the first recording layer b2 is less than 4 nm, too much light may penetrate therethrough so that the recording sensitivity of the first recording layer b2 may be degraded and its resistance with respect to repeated recording may be degraded. On the other hand, when the thickness of the first recording layer b2 is greater than 12 nm, the light permeability of the first information layer 15b may be too low, and in turn, the recording sensitivity of the second information layer 15d may be degraded.

The second recording layer d2 preferably has a thickness of 10-20 nm.

The first reflective layer b4 preferably has a thickness of 5-12 nm. When the thickness of the first reflection layer is less than 5 nm, the reflectance of the first reflective layer b4 may be degraded, and it may become difficult to secure a predetermined signal amplitude. When the thickness of the first reflective layer b4 is greater than 12 nm, the light permeability of the first information layer 15b may be too low, and in turn, the recording sensitivity of the second information layer 15d may be degraded. It is noted that the first reflective layer b4 is preferably made of Cu and Ag in order to obtain good recording characteristics at the first recording layer b2. In one example, the Cu and Ag may be used in an alloy. In another example, Cu having a small amount of impurity element incorporated therein at 0.2-5.0 weight % may be used, the impurity element being at least one metal element selected from a group of Mo, Ta, Nb, Zr, Ni, Cr, Ge, and Au, for example, so that reproducing stability and reliability of the first information layer 15b may be improved.

The second reflective layer d4 does not necessarily have to be semi-transparent like the first reflective layer b4, and may be made of any suitable metal reflective film. The thickness of the second reflective film d4 may be approximately equal to the thickness of the reflective layer of a conventional single layer phase change type optical disk, preferably within a range of 100-200 nm. When the thickness of the second reflective layer d4 is less than 100 nm, heat dissipation effects may not be obtained, and jitter may be degraded. When the thickness of the second reflective layer d4 is greater than 200 nm, substantial warping of the substrate may occur upon forming the second reflective film d4, and the mechanical characteristics of the optical disk may be degraded.

The upper protective layer is configured to prevent degradation and alteration of the recording layer, reinforce the bond with the recording layer, and improve recording characteristics, for example. The material used for the upper protective layer is preferably a transparent material that has good light permeability and a melting point that is higher than that of the recording layer. It is noted that in a conventional single layer phase change type optical disk, $ZnS—SiO_2$ is commonly used for the upper protective layer, and in such a case, the mixture ratio is preferably $ZnS:SiO_2=80:20$. However, in a two-layer phase change type optical disk, since the first reflective layer is arranged to be thin, heat dissipation may not be adequately realized and information recording on the first recording layer may be difficult. Thereby, a material having good heat conductivity is preferably used as the first upper protective layer; that is, a material that has better heat conductivity than $ZnS—SiO_2$ is preferably used. Specifically, metal oxides such as ZnO, $SnO_2$, $Al_2O_3$, $TiO_2$, $In_2O_3$, MgO, $ZrO_2$, TaO, and $Ta_2O_5$; nitrides such as $Si_3N_4$, AlN, TiN, BN, and ZrN; sulfides such ZnS, $In_2S_3$, and $TaS_4$; carbides such as SiC, TaC, $B_4C$, WC, TiC, ZrC; diamond like carbon; and combinations thereof may be used, for example. However, it is noted that in a case where Ag is used as the first reflective layer, deposition of a sulfide thereon is preferably avoided since the Ag and S may react with one another to cause inconveniences.

The first upper protective layer b3 preferably has a thickness within the range of 3-30 nm. When the thickness of the first upper protective layer b3 is less than 3 nm, the light reflectance of the first information layer 15b may be too high so that it may be difficult to secure a predetermined modulation level. When the thickness of the first upper protective layer b3 is greater than 30 nm, the light reflectance of the first information layer 15b may be too low so that it may be difficult to secure a predetermined signal amplitude.

As for the material of the second upper protective layer d3, $ZnS—SiO_2$ may be used as in the single layer phase change type optical disk, or other oxides, nitrides, and sulfides may be used as well. Since the second reflective layer d4 is arranged to have a sufficient thickness, heat dissipation may be adequately realized upon recording information on the second recording layer d2 regardless of the material of the second upper protective layer d4. However, it is noted that in a case where Ag is used as the second reflective layer d4, deposition of a sulfide as the second upper protective film d3 is preferably avoided since the Ag and S may react with one another to create inconveniences. In one preferred embodiment, when Ag is used as the second reflective layer d4, an interfacial layer made of TiOC (e.g., with a thickness of 4 nm) may be arranged between the second upper protective layer d3 and the second reflective layer d4.

The second upper protective layer d3 preferably has a thickness within the range of 3-30 nm. When the thickness of the second upper protective layer is less than 3 nm, recording sensitivity may be degraded. On the other hand, when the thickness of the second upper protective layer d3 is greater than 30 nm, heat may be trapped leading to jitter degradation, for example.

The lower protective layer is configured to prevent degradation and alteration of the recording layer, reinforce the bond with the recording layer, and improve recording characteristics, for example. The material used for the lower protective layer is preferably a transparent material that has good light permeability and a melting point that is higher than that of the recording layer. It is noted that metal oxides, nitrides, sulfides, and carbides are often used. For example, metal oxides such as ZnO, $SnO_2$, $Al_2O_3$, $TiO_2$, $In_2O_3$, MgO, $ZrO_2$, TaO, and $Ta_2O_5$; nitrides such as $Si_3N_4$, AlN, TiN, BN, and ZrN; sulfides such ZnS, $In_2S_3$, and $TaS_4$; carbides such as SiC, TaC, $B_4C$, WC, TiC, ZrC; diamond like carbon; and combinations thereof may be used, for example. It is noted that these materials may be used alone, or a mixture thereof may be used. Also, an impurity may be included in these materials as is necessary or desired. It is noted that $ZnS—SiO_2$, which is a mixture of ZnS and $SiO_2$, is commonly used as the material of the lower protective layer, and in such a case, the mixture ratio is preferably $ZnS:SiO_2=80:20$. $ZnS—SiO_2$ has a high refraction index n and an extinction coefficient that is substantially equal to zero so that the absorption efficiency of the recording layer may be improved. Also, the coefficient of heat conductivity of $ZnS—SiO_2$ is a small value so that dispersion of heat generated from light absorption may be suitably controlled. In this way, the temperature of the recording layer may be raised to its melting temperature.

The first lower protective layer b1 preferably has a thickness within the range of 40-80 nm. When the thickness of the first lower protective layer b1 is less than 40 nm, light permeability of the first information layer 15b may decrease, and its resistance with respect to repeated recording may be degraded. On the other hand, when the thickness of the first lower protective layer b1 is greater than 80 nm, although good resistance with respect to repeated recording may be obtained, light permeability of the information layer 15b may be degraded and substantial warping of the substrate may occur upon depositing the first lower protective layer b1 so that mechanical characteristics of the optical disk may be degraded.

The second lower protective layer d1 preferably has a thickness within the range of 110-160 nm. When the thickness of the second lower protective film is less than 110 nm, the reflectance of the second information layer 15d may decrease and the predetermined signal amplitude may not be obtained upon reproduction. On the other hand, when the thickness of the second lower protective layer d1 is greater than 160 nm, light permeability of the second information layer 15d may decrease and substantial warping may occur at the substrate upon deposition of the second lower protective film d1 so that the mechanical characteristics of the optical disk may be degraded.

The heat diffusion layer b5 preferably has a large coefficient of heat conductivity in order to rapidly cool the first recording layer b2 when light is irradiated thereon. Also, the heat diffusion layer b5 preferably has a low absorption rate with respect to the wavelength of the irradiated light; that is, the heat diffusion layer b5 is preferably arranged to be transparent with respect to the irradiated light so that recording and reproduction may be performed on the second information layer d2. In this respect, the heat diffusion layer b5 preferably includes at least one of a nitride, an oxide, a sulfide, a carbide, or a fluoride. For example, the heat diffusion layer b5 may include AlN, $Al_2$, SiC, SiN, IZO, ITO ($IN_2O_3$—$SnO_2$), DLC (diamond like carbon), or BN. It is noted that IZO or ITO is particularly preferred, and in the case of using ITO, tin oxide is preferably included in the ITO at 1-10 weight %. When the proportion of the tin oxide is greater or less than the above range, heat conductivity and permeability of the heat diffusion layer b5 may be degraded. Also, in order to improve reliability, another element may be added at a range of 0.1-5.0 weight %. When the proportion of the added element is less than the above range, improvement in reliability may not be obtained. When the proportion of the added element is greater than the above range, the light absorption rate may increase and the light permeability may decrease.

Also, in the case where IZO is used in place of ITO, internal stress within the optical disk may be reduced so that change in film thickness over time may be substantially prevented. In one preferred embodiment, $IN_2O_3$ is included in the IZO and ITO preferably at around 90 molar %.

The heat diffusion layer b5 preferably has a thickness within a range of 40-80 nm. When the thickness of the heat diffusion layer b5 is less than 40 nm, light permeability of the first information layer 15b may decrease and heat dissipation may not be adequately realized. When the thickness of the heat diffusion layer b5 is greater than 80 nm, light permeability of the first information layer 15b may decrease.

The first substrate 15a is preferably arranged to allow adequate permeation of irradiated light that is used for recording and reproducing information. The first substrate 15a may be a made of a material that is conventionally used such as glass, ceramics, or resin. It is noted that resin is particularly preferred in view of its moldability and cost. As specific examples of resin, polycarbonate resin, acryl resin, epoxy resin, polystyrene resin, acrylic nitrile-styrene copolymer resin, polyethylene resin, polypropylene resin, silicon resin, fluorine resin, ABS resin, or urethane resin may be used. It is noted that acrylic resin such as polycarbonate resin and polymethylmethacrylate (PMMA) is particularly preferred in view of its moldability, optical characteristics, and cost. The surface of the first substrate 15a on which the first information layer 15b is deposited has a concavo-convex pattern such as a spiral groove or concentric grooves formed thereon. This concavo-convex pattern may be formed through injection molding or a photopolymer process, for example. The thickness of the first substrate is preferably arranged to be within the range of 10-600 μm.

It is noted that the same material of the first substrate 15a may be used for the second substrate 15e. Alternatively, a material that is opaque with respect to the irradiated light for recording or reproducing information may be used; that is, the first substrate 15a and the second substrate 15e may be made of different materials and have differing groove patterns, for example. The thickness of the second substrate 15e is not particularly restricted to a certain range; however, the thickness of the second substrate 15e is preferably arranged such that the total thickness of the first substrate 15a and the second substrate 15e may be approximately 1.2 mm.

The intermediate layer 15c is preferably arranged to have a low light absorption rate with respect to the wavelength of the irradiated light for recording and reproducing information, and resin is preferably used as the material of the intermediate layer 15c in view of its moldability and cost. For example, UV curable resin, delayed resin, or heat reversible resin may be used. The second substrate 15e and the intermediate layer 15c may have a concavo-convex pattern such as a spiral groove or concentric grooves formed thereon through injection molding or a photopolymer process, for example. The intermediate layer 15c is for realizing optical isolation between the first information layer 15b and the second information layer 15d, and its thickness is preferably arranged to be within the range of 10-70 μm. When the thickness of the intermediate layer 15c is less than 10 μm, crosstalk is likely to occur between the information layers. On the other hand, when the thickness of the intermediate layer 15c is greater than 70 μm, spherical aberration may occur upon recording/reproducing information on/from the second recording layer d2 so that the recording operation or the reproducing operation may be hindered.

According to the present embodiment, the groove of the optical disk 15 is arranged to wobble at predetermined periods in a manner similar to the groove of the DVD+RW, and information may be recorded on the optical disk 15 as ADIP information through phase modulation. In the present embodiment, it is assumed that the ADIP information includes various types of information used in recording processes described below. In other words, setting value information used for obtaining an optimum recording power and an optimum erasing power is preformatted in at least one of a lead-in area or a lead-out area of the optical disk 15.

In the following, a method of fabricating the optical disk 15 is described. The method for fabricating the optical disk 15 includes a film deposition process, an initialization process, and an adhesion process. In the exemplary fabrication process flow described below, it is assumed that the above processes (i.e., film deposition, initialization, and adhesion) are performed in the above order.

In the film deposition process, the first lower protective layer b1, the first recording layer b2, the first upper protective layer b3, the first reflective layer b4, and the heat diffusion layer b5 are deposited in this order on the surface of the first substrate 15a on which the concavo-convex pattern is formed. The structure realized by arranging the first information layer 15b on the first substrate 15a is referred to as 'first recording member' hereinafter. Also, the second reflective layer d4, the second upper protective layer d3, the second recording layer d2, and the second lower protective layer d1 are deposited in this order on the surface of the second substrate 15e on which the concavo-convex pattern is formed. The structure realized by arranging the second information layer 15d on the second substrate 15e is referred to as 'second recording member' hereinafter. It is noted that the layers may be deposited through various vapor-phase growth processes (e.g., vacuum vaporization process, sputtering process, plasma CVD process, ion plating process, electron beam vaporization process). Of these exemplary processes, the sputtering process is particularly preferred since it can realize good productivity and good film quality, for example. Generally, in the sputtering process, an inactive gas such as argon is introduced while performing the film deposition. In one embodiment, oxygen or nitrogen may be mixed into such inactive gas to realize the so-called reaction sputtering process, for example.

In the initialization process, energy light such as a laser beam is irradiated on the first recording member and the second recording member, and initialization, namely, crystallization of the surfaces of the recording layers is realized. In a case where one of the layers may peel off (exfoliate) in this initialization process due to the energy of the laser beam, an over-coating process may be performed in which UV resin is spin coated on the heat diffusion layer b5 and the second lower protective layer d1, respectively, after which ultraviolet rays are irradiated on the UV resin, for example.

In the adhesion process, the first recording member, the second recording member, and the intermediate layer 15c are adhered to each other. For example, UV resin may be applied to either one of the surface of the heat diffusion layer b5 or the surface of the second lower protective layer d1, and the heat diffusion layer b5 and the second lower protective layer d1 may be arranged to face against each other to adhere the first recording member and the second recording member together. Then, ultraviolet rays may be irradiated to cure the UV resin. In this way, the first recording member and the second recording member may be adhered together via the intermediate layer 15c to form the optical disk 15.

It is noted that in one alternative embodiment, the adhesion process may be performed before the initialization process. In this case, the first recording member and the second recording member are adhered together via the intermediate layer 15c after which the initialization process is performed on the recording layers starting from the first substrate 15a side.

Figure 3:
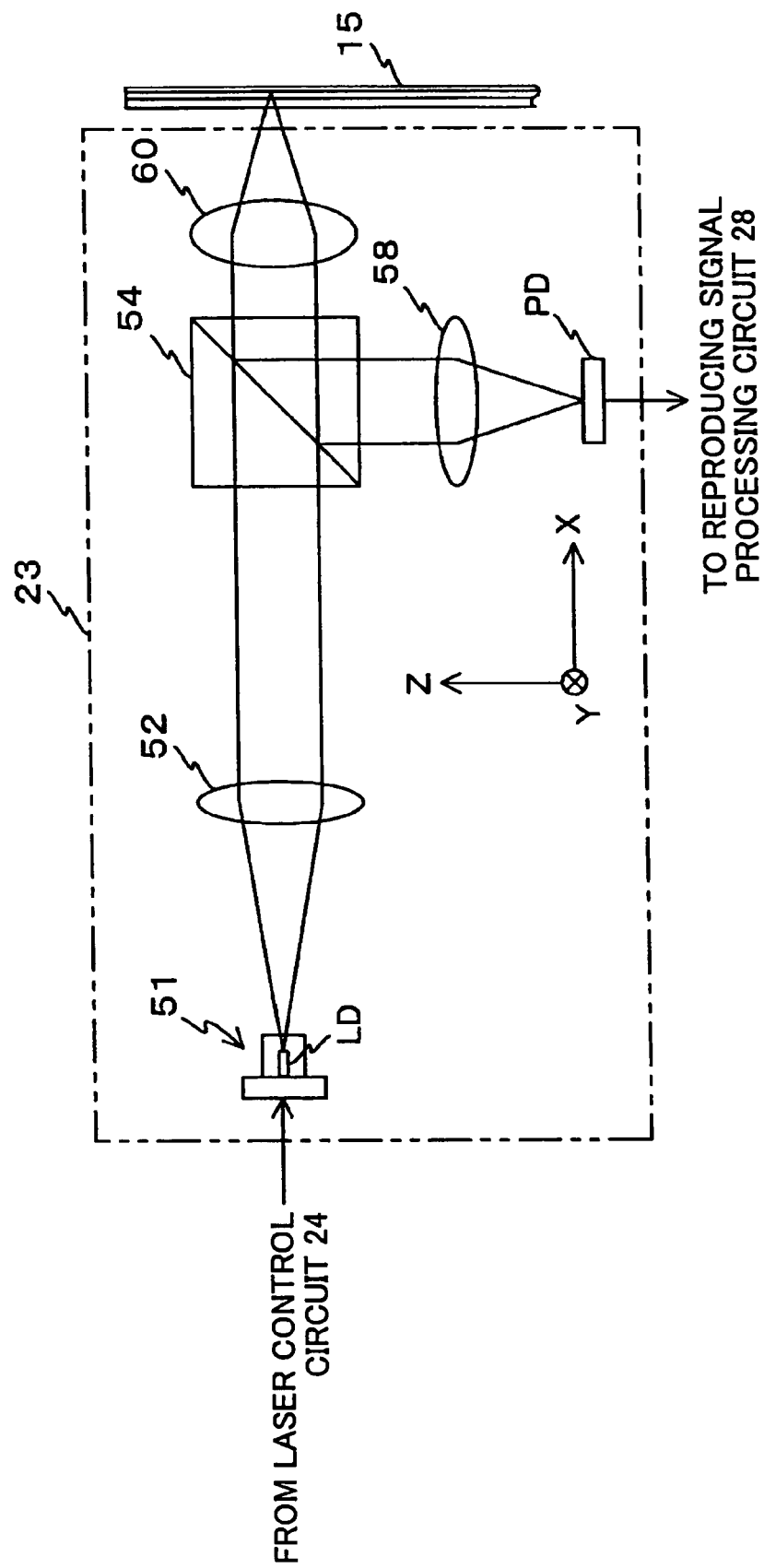
FIG. 3 is a diagram showing a configuration of an optical pickup device of the optical disk apparatus of FIG. 1.

Referring back to FIG. 1, the optical pickup device 23 is configured to irradiate a laser beam on the recording layer to be accessed out of the two recording layers b2 and d2 of the optical disk 15 (referred to as 'accessing recording layer' hereinafter), and receive light reflected from the optical disk 15. As shown in FIG. 3, the optical pickup device 23 includes a light source unit 51, a coupling lens 52, a beam splitter 54, an objective lens 60, a condensing lens 58, a light receiver PD, and a drive system including a focusing actuator and a tracking actuator, for example, (not shown) for driving the objective lens 60.

As is shown in FIG. 3, the light source unit 51 includes a semiconductor laser LD as a light source that emits a laser beam with a wavelength of 660 nm, for example. In the present embodiment, it is assumed that the maximum intensity emitting direction for the laser beam emitted from the light source unit 51 is in the +X direction shown in FIG. 3. The collimator lens 52 is arranged at the +X side of the light source unit 51, and is configured to arrange the light emitted from the light source unit 51 to be substantially parallel.

The beam splitter 54 is arranged at the +X side of the collimator lens 52. The beam splitter 54 is configured to allow light from the collimator lens 52 to pass through and diverge light reflected from the optical disk 15 in the −Z direction. The objective lens with NA=0.65 is arranged at the +X side of the beam splitter 54, and this objective lens 60 is configured to condense light passing through the beam splitter 54 onto the accessed recording layer of the optical disk 15.

The detection lens 58 is arranged at the −Z side of the beam splitter 54, and is configured to condense the reflected light that is divert in the −Z direction at the beam splitter 54 onto the light receiving surface of the light receiver PD. The light receiver PD includes plural light receiving elements that output signals including wobble signal information, reproducing data information, focus error information, and track error information, for example. The light receiving elements of the light receiver PD are configured to generate signals according to the amount of light received through photoelectric transfer and output the generated signals to the reproducing signal processing circuit 28.

The focusing actuator (not shown) is configured to drive the objective lens 60 in minute detail with respect to the focusing direction corresponding to the optical axis direction of the objective lens 60. In the present embodiment, the optimum position for the objective lens 60 with respect to the focusing direction when the first recording layer b2 corresponds to the accessing recording layer is referred to as 'first lens position', and the optimum position of the objective lens 60 with respect to the focusing direction when the second recording layer d2 corresponds to the accessing recording layer is referred to as 'second lens position'.

The tracking actuator (not shown) is configured to drive the objective lens 60 in minute detail with respect to the tracking direction corresponding to the direction that is orthogonal to the track tangential line.

In the following, the light reflected from the optical disk 15 is described.

When the first recording layer b2 corresponds to the accessing recording layer, the objective lens 60 is positioned at the first lens position. In this way, light emitted from the light source unit 51 may be condensed at the first recording layer b2 by the objective lens 60. Then, light reflected from the first reflective layer b4 is incident on the objective lens 60 as signal light.

When the second recording layer d2 corresponds to the accessing recording layer, the objective lens 60 is positioned at the second lens position. In this way, light emitted from the light source unit 51 may be condensed at the second recording layer d2 by the objective lens 60. Then, the light flux reflected from the second reflective layer d4 is incident on the objective lens 60 as signal light.

Referring back to FIG. 1, the reproducing signal processing circuit 28 acquires servo signals (e.g., focus error signals, track error signals), address information, synchronizing information, RF signals, modulation information, gamma value information, asymmetry information, and amplitude information of a sum signal, for example, based on the output signals of the light receiver PD (e.g., plural photoelectric transfer signals).

The servo signals acquired at the reproducing signal processing circuit 28 are output to the drive control circuit 26, the address information is output to the CPU 40, and the synchronizing signal is output to the encoder 25 and the drive control circuit 26, for example. Also, the reproducing signal processing circuit 28 is configured to perform processes such as a decoding process and an error detection process on the RF signal. Further, upon detecting an error, the reproducing signal processing circuit 28 performs an error correction process on the RF signal. Then, the reproducing signal processing circuit 28 stores the processed signal as reproducing data in the buffer RAM 34 via the buffer manager 37. Also, the address information included in the reproducing data is output to the CPU 40.

The reproducing signal processing circuit 28 transmits the modulation information, the gamma information, the asymmetry information, and the sum signal amplitude information to the CPU 40.

Figure 4:
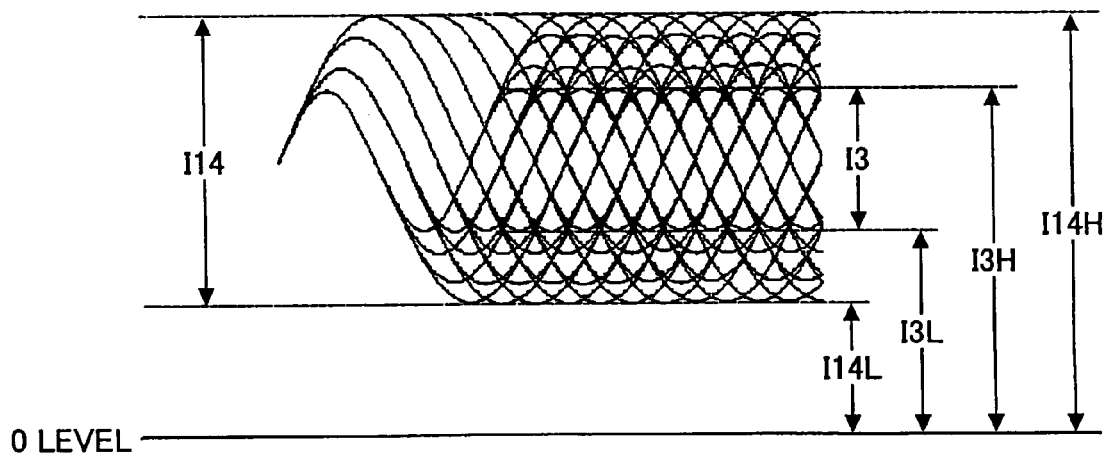
FIG. 4 is a diagram describing a modulation level and asymmetry relating to an embodiment of the present invention.

Referring to FIG. 4, given that the reflectance of 14T crystalline space is denoted as I14H, and the reflectance of 14T amorphous mark is denoted as I14L, modulation level M is defined by the following formula (1):

$$\text{Modulation Level } M=(I14H-I14L)/I14H \qquad (1)$$

Also, given that the reflectance of 3T crystalline spaces is denoted as I3H, and the reflectance of 3T amorphous marks is denoted as I3L, asymmetry A is defined by the following formula (2):

$$\text{Asymmetry } A=(I14H+I14L-I3H-I3L)/2(I14H-I14L) \qquad (2)$$

Referring back to FIG. 1, the drive control circuit 26 generates a drive signal for the drive system based on the servo signal from the reproducing signal processing circuit 28, and outputs the generated signal to the optical pickup device 23. In this way, the tracking control and focus control operations may be realized. Also, the drive control circuit 26 generates a drive signal for driving the seek motor 21, and a drive signal for driving the spindle motor 22 based on commands from the CPU 40. The motor drive signals generated by the drive control circuit 26 are output to the seek motor 21 and the spindle motor 22, respectively.

The buffer RAM 34 temporarily stores data such as data to be recorded on the optical disk 15 (recording data) and data reproduced from the optical disk 15 (reproducing data). The input/output of data in the buffer RAM 34 is managed by the buffer manager 37.

The encoder 25 retrieves the recording data stored in the buffer RAM 34 via the buffer manager 37 based on a command from the CPU 40, and performs processes such as modulating the retrieved signal and attaching error correction codes to the signal to generate a write signal for the optical disk 15. In the present embodiment, the generated write signal is output to the laser control circuit 24.

The laser control circuit 24 controls the light emitting power of the semiconductor laser LD. For example, in a recording operation, the laser control circuit 24 generates a drive signal for the semiconductor laser LD based on the write signal, recording conditions, and the light emitting characteristics of the semiconductor laser LD.

The interface 38 is a bidirectional communication interface realizing an interface with a superordinate apparatus 90 (e.g., personal computer), and may conform to standard interface schemes such as the ATAPI (AT Attachment Packet Interface), the SCSI (Small Computer System Interface), or the USB (Universal Serial Bus).

The flash memory 39 stores programs described by code readable by the CPU 40 and light emitting characteristics of the semiconductor laser LD, for example.

The CPU 40 controls operations of the respective units of the optical disk apparatus 20 according to the programs stored in the flash memory 39, and stores data for realizing such control in the RAM 41 and the buffer RAM 34.

(Recording Process)

In the following, a recording process that is performed at the optical disk apparatus 20 when the recording request is issued by the superordinate apparatus 90 is described with reference to FIGS. 5 and 6. It is noted that FIGS. 5 and 6 are flowcharts illustrating a sequence of process algorithms that are executed by the CPU 40.

Figure 5:
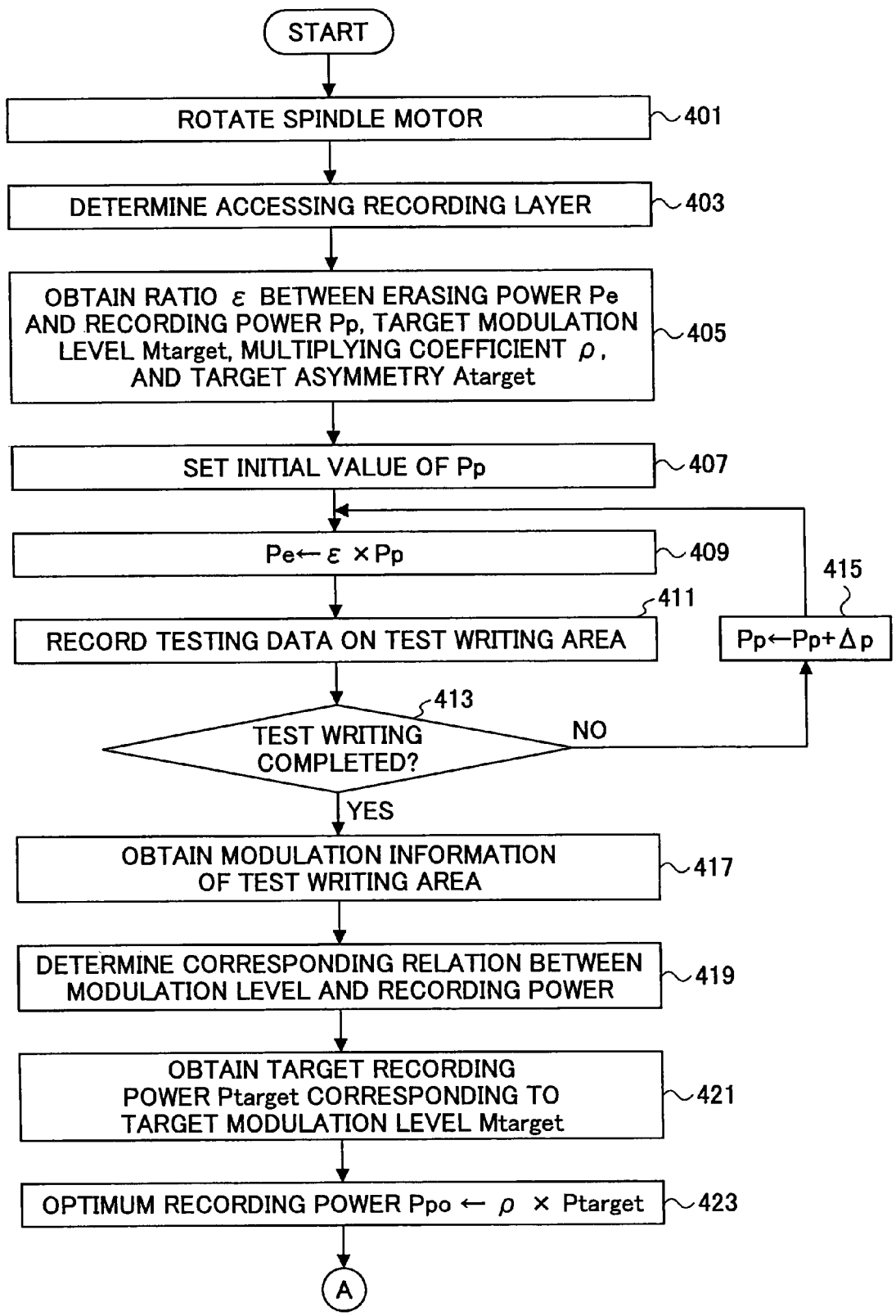
FIG. 5 is a flowchart illustrating a first part of a recording process performed at the optical disk apparatus of FIG. 1 according to one embodiment.
Figure 6:
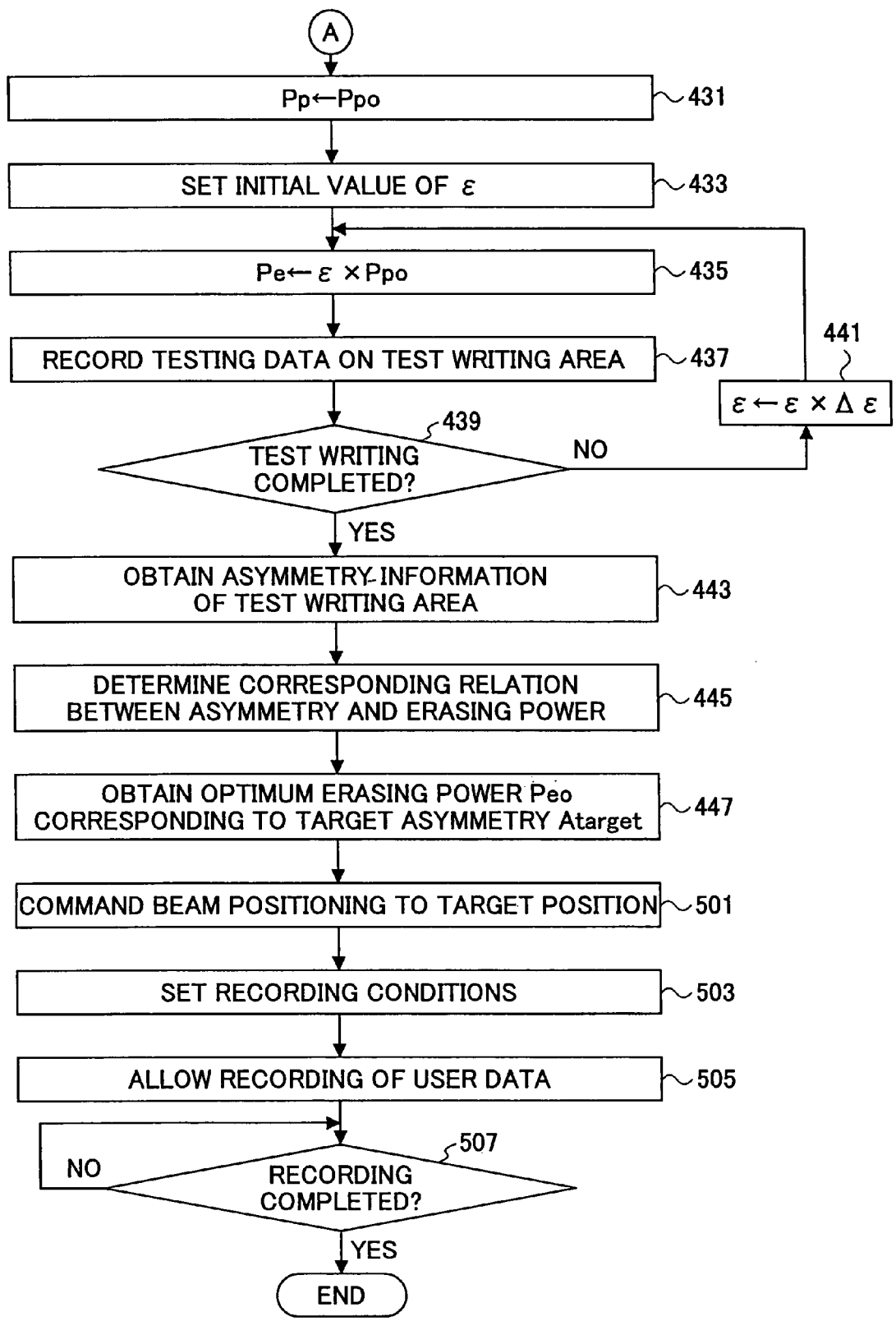
FIG. 6 is a flowchart illustrating a second part of the recording process performed at the optical disk apparatus of FIG. 1.

In response to receiving a recording request signal from the superordinate apparatus 90, the start address of the program corresponding to the flowchart of FIGS. 5 and 6 stored in the flash memory 39 is set to the program counter of the CPU 40, and the recording process is started.

First, in step 401, a command is sent to the drive control circuit 26 to rotate the optical disk 15 at a predetermined linear speed (or angular speed), and a signal is sent to the reproducing signal processing circuit reporting that a recording request signal has been received from the superordinate apparatus 90.

Next, in step 403, a designated address is extracted from the recording request signal, and a determination is made as to whether the accessing recording layer is the first recording layer b2 or the second recording layer d2.

Next, in step 405, ADIP information is retrieved from the optical disk 15, and the ratio $\epsilon$ between the erasing power Pe and the recording power Pp, the target modulation level Mtarget, the multiplying coefficient $\rho$ for obtaining the optimum recording power Ppo, and the target asymmetry Atarget are obtained and stored in the RAM 41.

Next, in step 407, an initial value of the recording power Pp is set, and the laser control circuit 24 is informed of the set value.

Next, in step 409, the erasing power Pe is calculated so that the ratio between the erasing power Pe and the recording power Pp may be equal to $\epsilon$, and the laser control circuit 24 is informed of the calculated erasing power Pe.

Next, in step 411, a command signal is issued instructing the recording of test data on a test writing area prearranged at the accessing recording layer. In turn, the test data are recorded on the test writing area via the laser control circuit 24 and the optical pickup device 23.

Next, in step 413, a determination is made as to whether the test writing has been completed. If the test writing has not been completed, a negative determination is made and the process moves on to step 415.

In step 415, a predetermined variation $\Delta p$ is added to the recording power Pp after which the process goes back to step 409.

It is noted that the steps 409, 411, 413, and 415 are repeated until a positive determination is obtained in step 413.

When test writing of data using plural predetermined recording powers Pp is completed, a positive determination is made in step 413, and the process moves on to step 417.

In step 417, the test writing area on which the test data are recorded is reproduced via the reproducing signal processing circuit 28 to acquire the modulation information.

Figure 7:
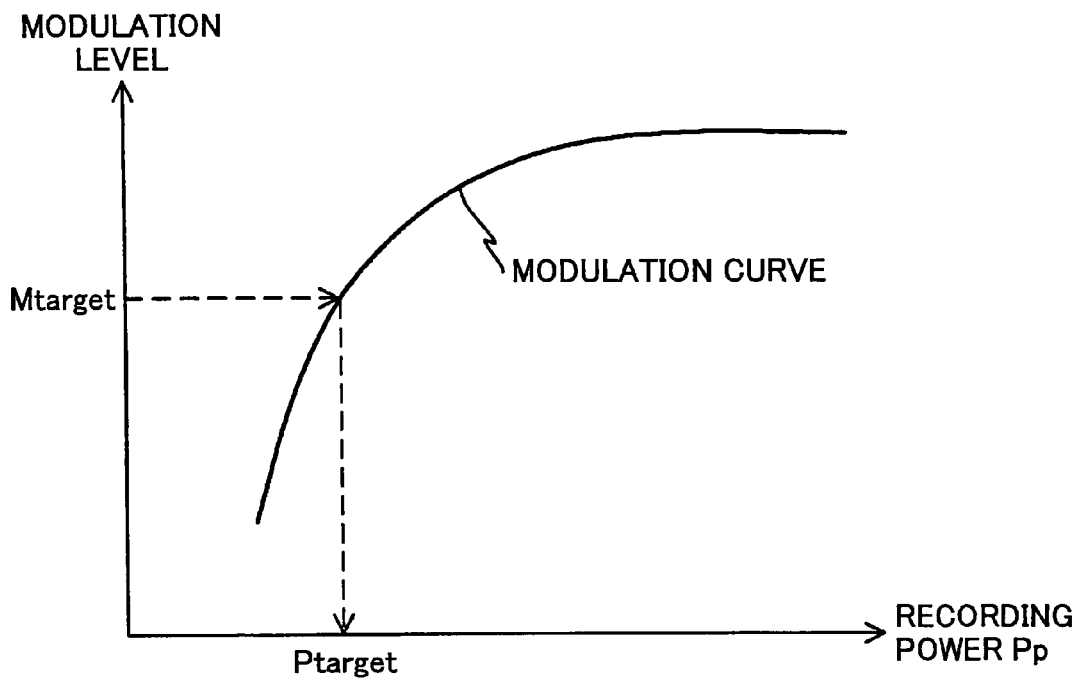
FIG. 7 is a graph showing a corresponding relationship between a target modulation level and a target recording power obtained in the recording process of FIGS. 5 and 6.

Next, in step 419, a corresponding relationship between the recording power Pp and the modulation level M such as that illustrated in FIG. 7 is determined.

Next, in step 421, the target modulation level Mtarget corresponding to the recording power value (Ptarget) is obtained based on the corresponding relationship between the recording power Pp and the modulation level M as is shown in FIG. 7.

Next, in step 423, the recording power optimum value (Ppo) is calculated based on the formula (3) indicated below:

$$Ppo=\rho \times P\text{target} \qquad (3)$$

Next, in step 431, the recording power is set to the optimum value Ppo, and the laser control circuit 24 is informed of the set recording power optimum value Ppo.

Next, in step 433, an initial value for the ratio E is set.

Next, in step 435, $\epsilon \times Ppo$ is calculated, and the laser control circuit 24 is informed of the calculated value as the erasing power Pe.

Next, in step 437, a command signal is issued instructing the recording of test data on the test writing area prearranged at the accessing recording layer. In turn, the test data are recorded on the test writing area via the laser control circuit 24 and the optical pickup device 23.

Next, in step 439, a determination is made as to whether the test writing has been completed. If the test writing has not been completed, a negative determination is made and the process moves on to step 441.

In step 441, the predetermined variation Δε is added to the ratio ε after which the process goes back to step 435.

It is noted that the steps 435, 437, 439, and 441 are repeated until a positive determination is obtained in step 439.

When test writing of data is completed using plural predetermined values of ε differing from each other, a positive determination is made in step 439, and the process moves on to step 443.

In step 443, the test writing area on which the test data have been recorded is reproduced via the reproducing signal processing circuit 28 to acquire the asymmetry information.

Figure 8:
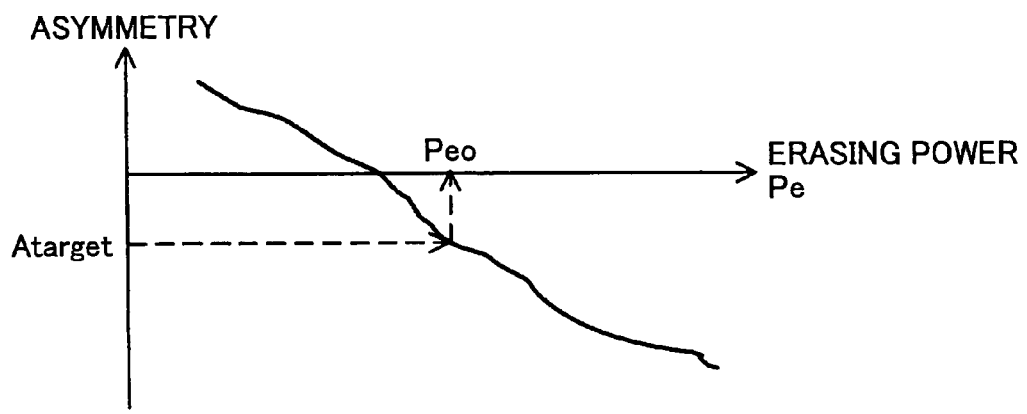
FIG. 8 is a graph showing a corresponding relationship between a target asymmetry and an optimum erasing power obtained in the recording process of FIGS. 5 and 6.

Next, in step 445, a corresponding relationship between the erasing power Pe and the asymmetry A is determined based on the asymmetry information, an example of such relationship being illustrated in FIG. 8.

Next, in step 447, the erasing power Peo corresponding to the target asymmetry Atarget is obtained based on the corresponding relationship between the erasing power Pe and the asymmetry A as is shown in FIG. 8, for example. This erasing power Peo is set as the optimum value of the erasing power.

Next, in step 501, a command signal is sent to the drive control circuit 26 so that a beam spot may be formed in the vicinity of a target position corresponding to the designated address. In turn, a seek operation is performed. It is noted that in a case where the seek operation is not necessary, this step may be skipped.

Next, in step 503, the recording conditions are set. For example, the recording power is set to the optimum value recording power Ppo, and the erasing power is set to the optimum value erasing power Peo.

Next, in step 505, recording is allowed, and thus, data may be recorded on a designated address with optimum recording conditions via the encoder 25, the laser control circuit 24, and the optical pickup device 23.

Next, in step 507, a determination is made as to whether the recording has been completed. If the recording has not been completed, a negative determination result is obtained, and the determination is made once again after a predetermined time period. If the recording has been completed, a positive determination result is obtained, and the recording process is hereby ended.

Figure 9:
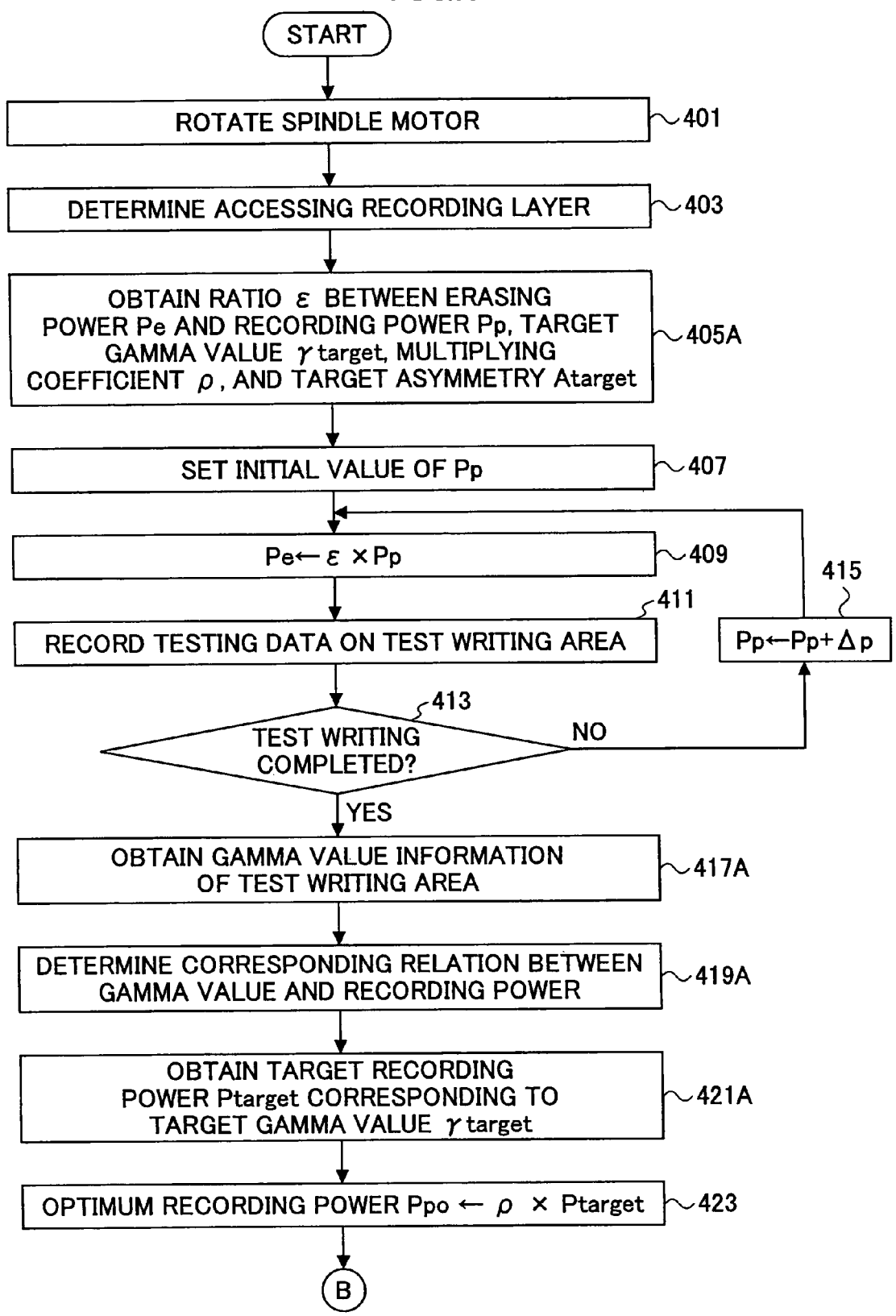
FIG. 9 is a flowchart illustrating a first part of a recording process according to a first modified embodiment of the recording process of FIGS. 5 and 6.
Figure 10:
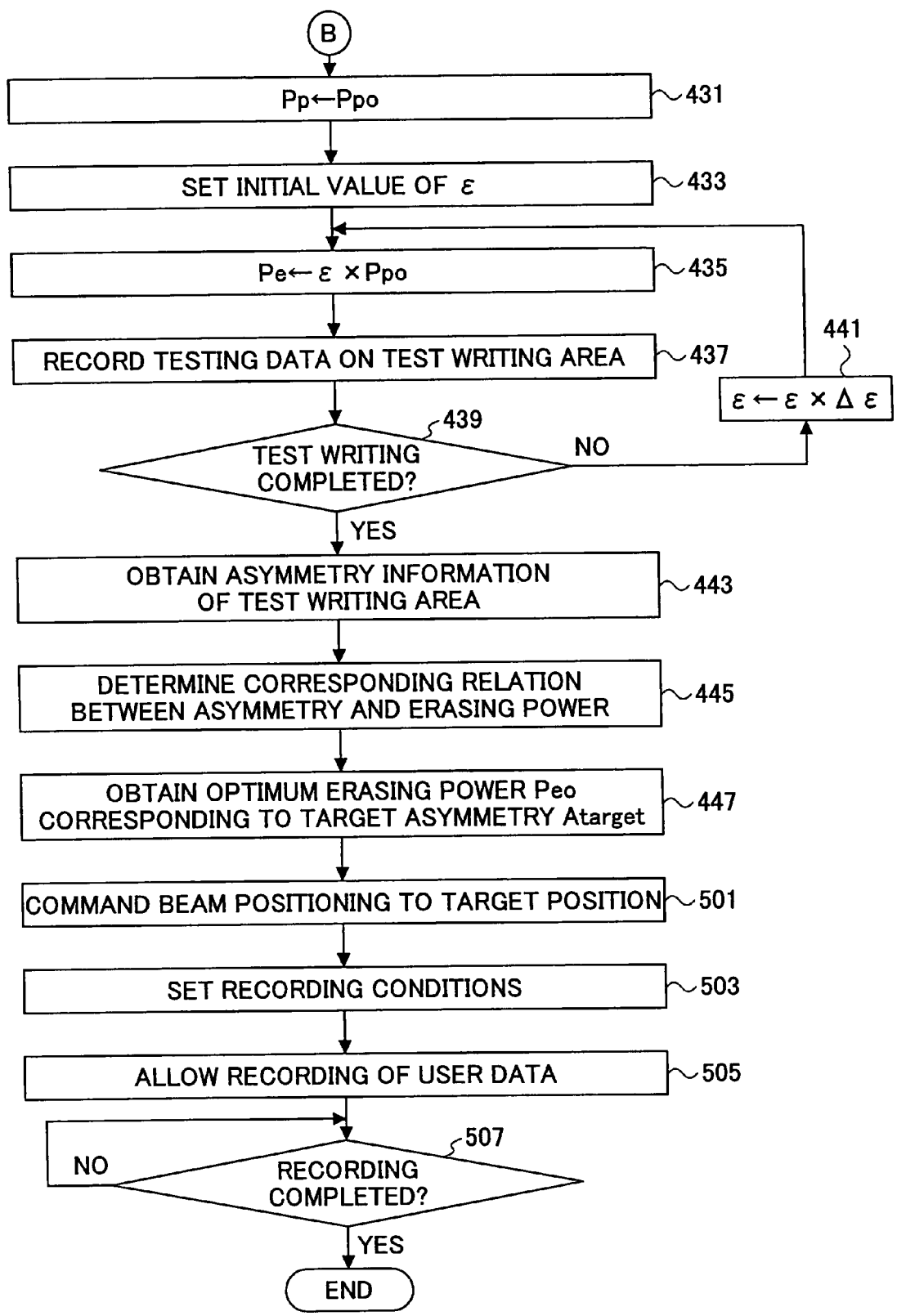
FIG. 10 is a flowchart illustrating a second part of the recording process according to the first modified embodiment.

It is noted that in the above-described recording process, the modulation level M is used to obtain the optimum value of the recording power Pp. However, the present invention is not limited to such an embodiment, and for example, in another embodiment, the optimum value of the recording power Pp may be obtained using the gamma value γ instead of the modulation level M as is shown in FIGS. 9 and 10. It is noted that in the flowcharts of FIGS. 9 and 10, process steps that are identical to those described with reference to FIGS. 5 and 6 are given the same reference numerals and their descriptions are omitted. In the following, features of the recording process of the present embodiment that are different from those of the previously described embodiment are described.

In the present embodiment, in step 405A, ADIP information is retrieved from the optical disk 15, and the ratio ε between the erasing power Pe and the recording power Pp, the target gamma value γtarget, the multiplying coefficient ρ, and the target asymmetry Atarget are obtained. It is noted that the target gamma value γtarget is preformatted in the optical disk 15 as part of the ADIP information.

In step 417A, the test writing area on which test data are recorded is reproduced via the reproducing signal processing circuit 28 to acquire the gamma value information.

Figure 11:
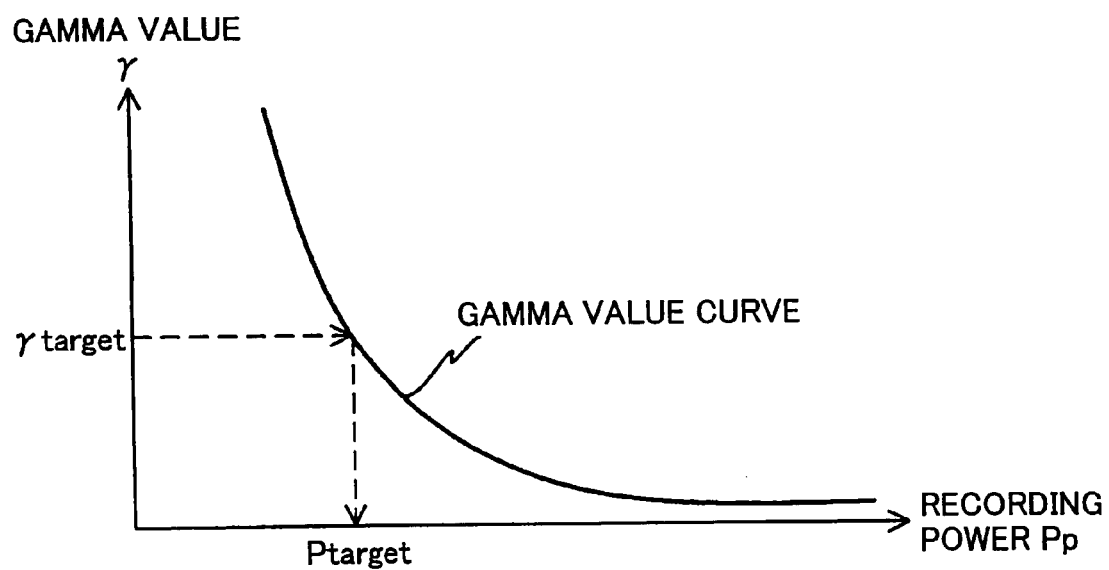
FIG. 11 is a graph showing a corresponding relationship between a target gamma value and a target recording power obtained in the recording process of FIGS. 9 and 10.

Next, in step 419A, a corresponding relationship between the recording power Pp and the gamma value γ is determined based on the gamma value information, an example of such relationship being shown in FIG. 11.

Next, in step 421A, the target recording power Ptarget corresponding to the target gamma value γ target is obtained based on the corresponding relationship between the recording power Pp and the gamma value γ as is shown in FIG. 11.

Figure 12:
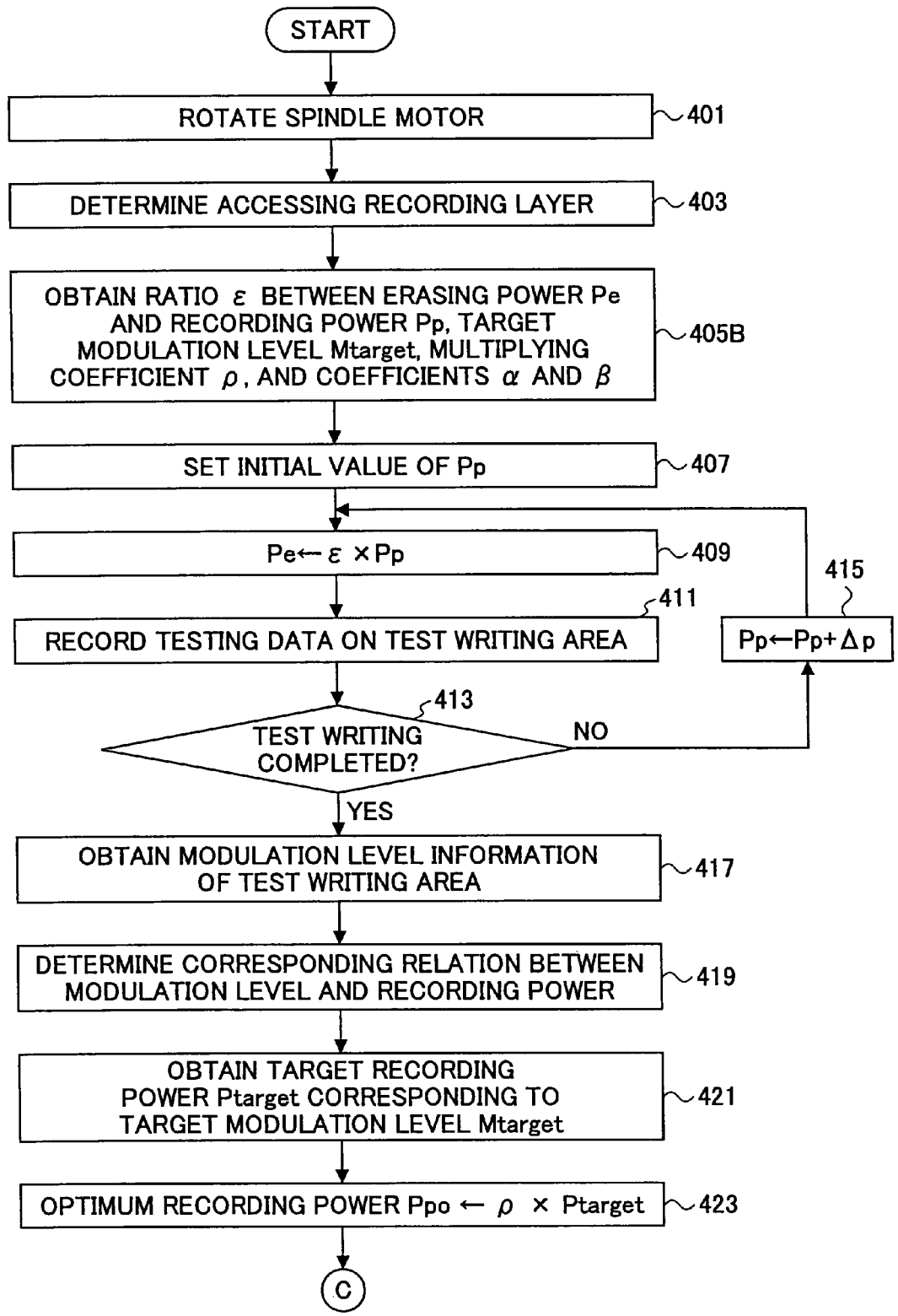
FIG. 12 is a flowchart illustrating a first part of a recording process according to a second modified embodiment of the recording process of FIGS. 5 and 6.
Figure 13:
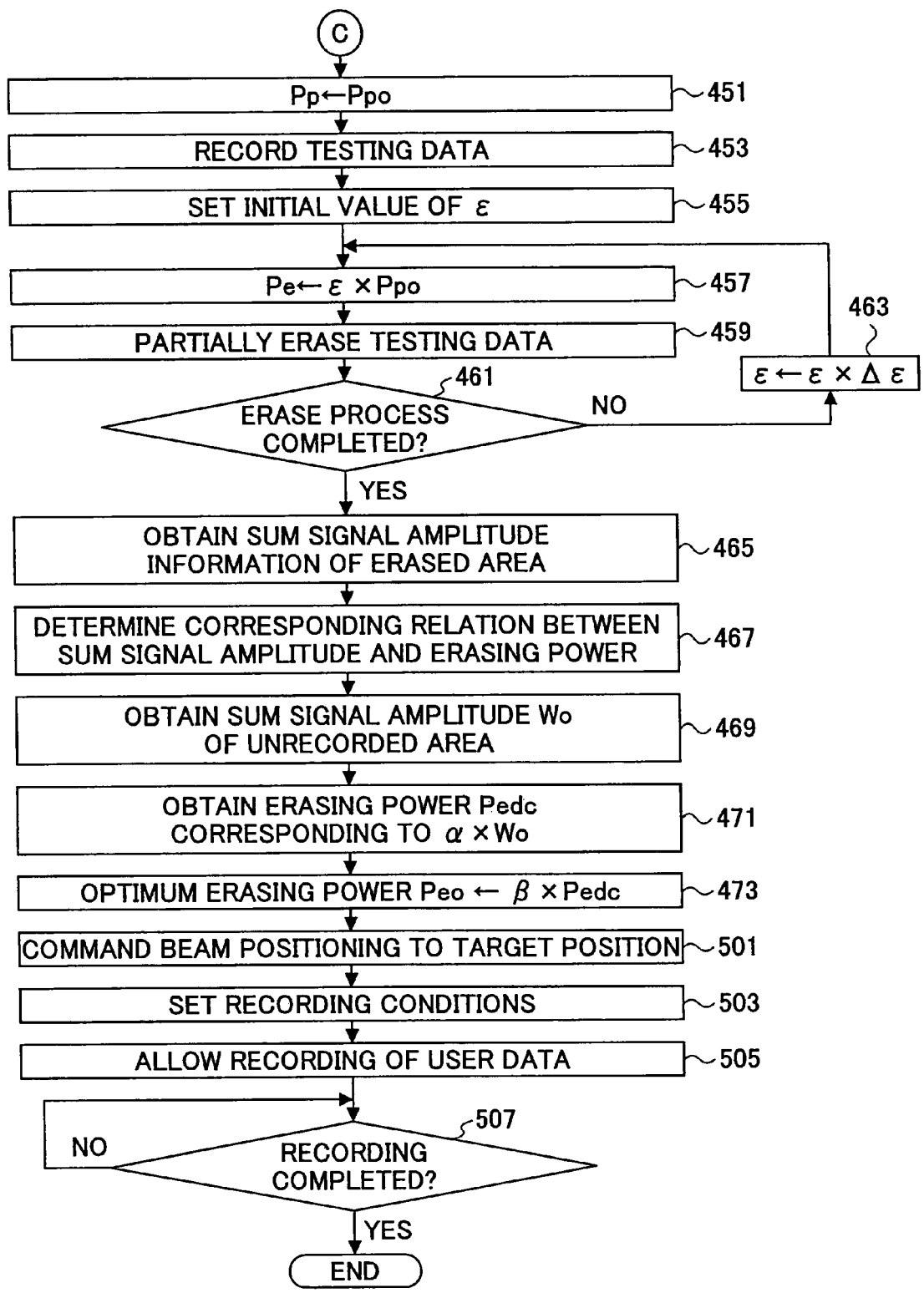
FIG. 13 is a flowchart illustrating a second part of the recording process according to the second embodiment.

Also, it is noted that in recording processes according to the above-described embodiments, the optimum value of the erasing power Pe is obtained using the asymmetry A. However, the present invention is not limited to such embodiments, and for example, in another embodiment, the optimum value of the erasing power Pe may be obtained using the amplitude of a sum signal obtained from the output signal of the light receiver PD as is illustrated in the flowcharts of FIGS. 12 and 13. It is noted that the process steps of the recording process illustrated in FIGS. 12 and 13 that are identical to those described in relationship to the previously described embodiments are given the same reference numerals and their descriptions are omitted. In the following, features of the recording process according to the present embodiment that are different from those of the previously described embodiments are described.

In the present embodiment, in step 405B, ADIP information is retrieved from the optical disk 15, and the ratio ε between the erasing power Pe and the recording power Pp, the target modulation level Mtarget, the multiplying coefficient ρ, and coefficients such as α and β are obtained. It is noted that the coefficients α and β are preformatted in the optical disk 15 as part of the ADIP information.

In step 451, the optimum value recording power Ppo is set as the recording power Pp, and the laser control circuit 24 is informed of the set recording power Ppo.

Next, in step 453, a command signal is issued instructing the recording of test data on the test writing area prearranged at the accessing recording layer. In this way, test data may be recorded with the optimum recording power Ppo.

Next, in step 455, an initial value of ε is determined.

Next, in step 457, ε×Ppo is calculated, and the laser control circuit 24 is informed of the calculated value as the erasing power Pe.

Next, in step 459, a command signal is issued instructing erasure of a portion of the test writing area on which the test data have been recorded. In this step, the so-called DC erasure is performed using the erasing power Pe.

Next, in step 461, a determination is made as to whether the erasure operation has been completed. If the erasure operation has not been completed, a negative determination is made, and the process moves on to step 463.

In step 463, a predetermined variation Δε is added to the value ε, and the process goes back to step 457.

It is noted that the steps 457, 459, 461, and 463 are repeated until a positive determination is obtained in step 461.

When the erasure operation using plural predetermined values of ε that differ from one another is completed, a positive determination is made in step 461, and the process moves on to step 465.

In step 465, the test writing area on which the erasure operation has been performed is reproduced, and the amplitude information of the sum signal is acquired.

Next, in step 467, a corresponding relationship between the amplitude Wdc of the sum signal and the erasing power is determined.

Next, in step 469, the amplitude Wo of a sum signal from an unrecorded area is obtained via the reproducing signal processing circuit 28.

Next, in step 471, the erasing power Pedc corresponding to α×Wo is obtained based on the corresponding relationship between the amplitude Wdc of the sum signal and the erasing power Pe.

Next, in step 473, β×Pedc is calculated, and the calculation result is set as the optimum erasing power value Peo. Then, the process moves on to step 501.

It is noted that the coefficients α and β may be set at the optical disk apparatus 20 side based on the type of the optical disk or the test data erasure operation result.

(Exemplary Applications)

Figure 14:
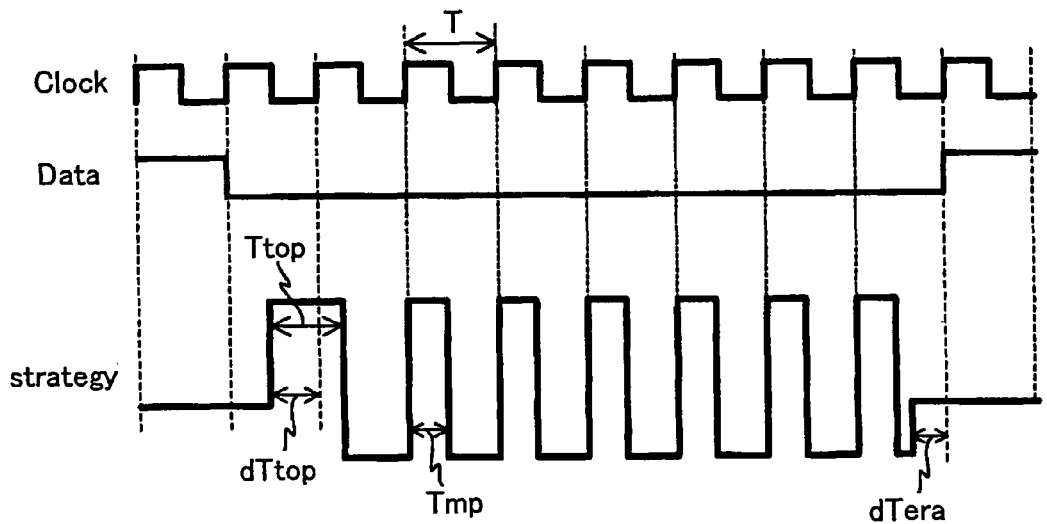
FIG. 14 is a diagram illustrating the 1T strategy as a recording strategy used in exemplary applications of the present invention.

In the following, exemplary applications of the present invention are described; however, it is noted that the present invention is by no way limited to these examples. In the following descriptions, it is assumed that the so-called 1T strategy (see FIG. 14) is used, and the recording linear speed is 9.2 m/s, the reproducing linear speed is 3.83 m/s, and the reproducing power is 1.4 mW. Also, it is assumed that the DVD sprinter (sheet-fed sputtering apparatus) by Balzers is used as the sputtering apparatus.

1. First Application

On a polycarbonate resin layer as the first substrate 15*a* with a diameter of 12 cm, a thickness of 0.565 mm, and one side having a continuous wobble groove formed thereon at a track pitch of 0.74 μm, ZnS (80 mol %)-$SiO_2$ (20 mol %) with a thickness of 60 nm as the first lower protective layer b1, $Ag_{0.5}In_{4.5}Sb_{69}Te_{24}Ge_2$ with a thickness of 8 nm as the first recording layer b2, $SnO_2$ (90 mol %)-$Ta_2O_5$ (10 mol %) with a thickness of 7.5 nm as the first upper protective layer b3, Cu (98.9 weight %)-Mo (1.1 weight %) with a thickness of 10 nm as the first reflective layer b4, and $In_2O_3$ (90 mol %)-ZnO (10 mol %) with a thickness of 60 nm as the heat diffusion layer b5 are deposited in this order in an Ar gas atmosphere through magnetron sputtering.

On a polycarbonate resin layer as the second substrate with a diameter of 12 cm, a thickness of 0.6 mm, and one side having a continuous wobble groove formed thereon at a track pitch of 0.74 μm, Ag with a thickness of 140 nm as the second reflective layer, $SnO_2$ (90 mol %)-$Ta_2O_5$ (10 mol %) with a thickness of 15 nm as the second upper protective layer d3, $Ag_{0.5}In_{4.5}Sb_{69}Te_{24}Ge_2$ with a thickness of 15 nm as the second recording layer d2, and ZnS (80 mol %)-$SiO_2$ (20 mol %) with a thickness of 140 nm as the second lower protective layer d1 are deposited in this order in an Ar gas atmosphere through magnetron sputtering.

UV curable resin (e.g., KAYARAD DVD-576M by Nippon Kayaku Co., Ltd.) is applied to the surface of the heat diffusion layer b5, and the second lower protective layer d1 is adhered to the heat diffusion layer b5. Then, ultraviolet rays are irradiated from the first substrate 15*a* side to cure the UV curable resin and arrange the UV curable resin layer into the intermediate layer 15*c*. In this way, a two-layer phase change type optical disk is created. In the present example, the thickness of the intermediate layer 15*c* is arranged to be 55 μm.

Then, using a dedicated apparatus for performing an initialization process, a laser beam is irradiated from the first substrate side 15*a*, and initialization processes are performed on the second recording layer d2 and the first recording layer b2 in this order. In the present example, the initialization process involves condensing a laser beam irradiated from a semiconductor laser (oscillation wavelength: 810±10 nm) with an objective lens of NA=0.55 on the respective recording layers. The initialization conditions for the second recording layer d2 is set such that the optical disk is rotated in CLV (constant linear speed) mode with a linear speed of 3 m/s, a feed amount of 36 μm/rotation, at a radial position (distance from the rotational center) of 23-58 mm, and an initialization power of 1050 mW. The initialization conditions for the first recording layer b2 are set such that the optical disk is rotated in CLV mode with a linear speed of 3 m/s, a feed amount of 50 μm/rotation, at a radial position of 23-58 mm, and an initialization power of 700 mW. It is noted that the light permeability of the first information layer after the initialization process is performed thereon is 37.4%.

Figure 15:
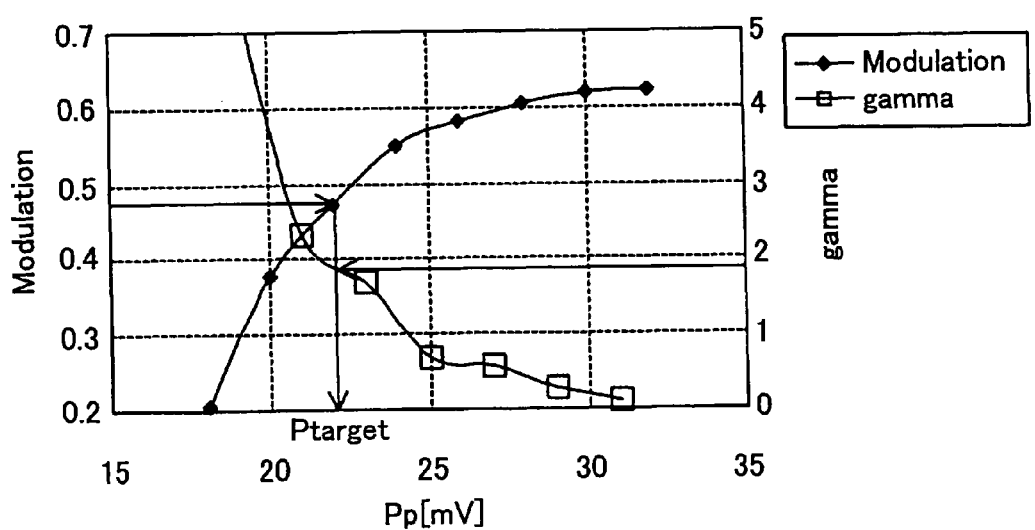
FIG. 15 is a graph illustrating data obtained in first and second exemplary applications of the present invention.
Figure 16:
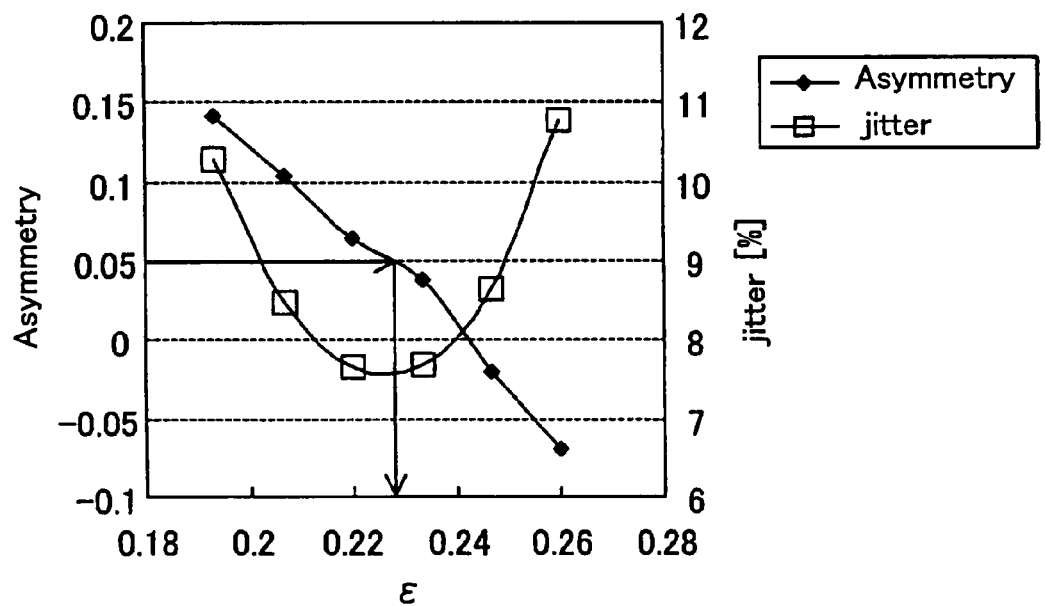
FIG. 16 is a graph illustrating data obtained in the first exemplary application.

In the present example, when Ttop=Tmp=0.188T, dTtop=0.6T, dTera=0.3T, and the 1T strategy is used to perform test writing on the first information layer 15*b*, a corresponding relationship between the modulation level and the recording power Pp as is illustrated in FIG. 15 is obtained. When the target modulation level and the multiplying coefficient are determined to be Mtarget=0.47 and ρ=1.36, then Ptarget=22 mW and Ppo=29.2 mW. When the recording power is fixed to the above optimum value recording power Ppo and ε is assigned to measure the asymmetry, data represented by FIG. 16 are obtained. When the target asymmetry is determined to be Atarget=0.05, a suitable jitter value of 7.6% may be obtained at the corresponding erasing power value. It is noted that jitter represents the temporal variation of the boundary of a binary signal with respect to a clock when the reflectances of a mark and a space are binarized into the binary signal using the slice level.

2. Second Application

The two layer phase change type optical disk as is described in the first example is used, and test writing is performed on the first information layer 15*b* in a manner similar to that described in the first example. In this way, a corresponding relationship between the gamma value and the recording power Pp as is shown in FIG. 15 is obtained. When the target gamma value and the multiplying coefficient are determined to be γtarget=1.9 and ρ=1.36, Ptarget=22 mW, Ppo=29.2 mW, and a suitable jitter value of 7.6% are obtained as in the first example.

3. Third Application

In the present example, the thickness of the first lower protective layer b1 is arranged to be 75 nm, the thickness of the first recording layer b2 is arranged to be 7.5 nm, the thickness of the first upper protective layer b3 is arranged to be 3 nm, and the thickness of the first reflective layer b4 is arranged to be 7 nm. It is noted that other structural features of the two-layer phase change type optical disk used in the present example are identical to those of the optical disk used in the previously described examples. It is noted that the reflectance of the first information layer 15*b* after the initialization process is performed thereon is 43.7%.

Figure 17:
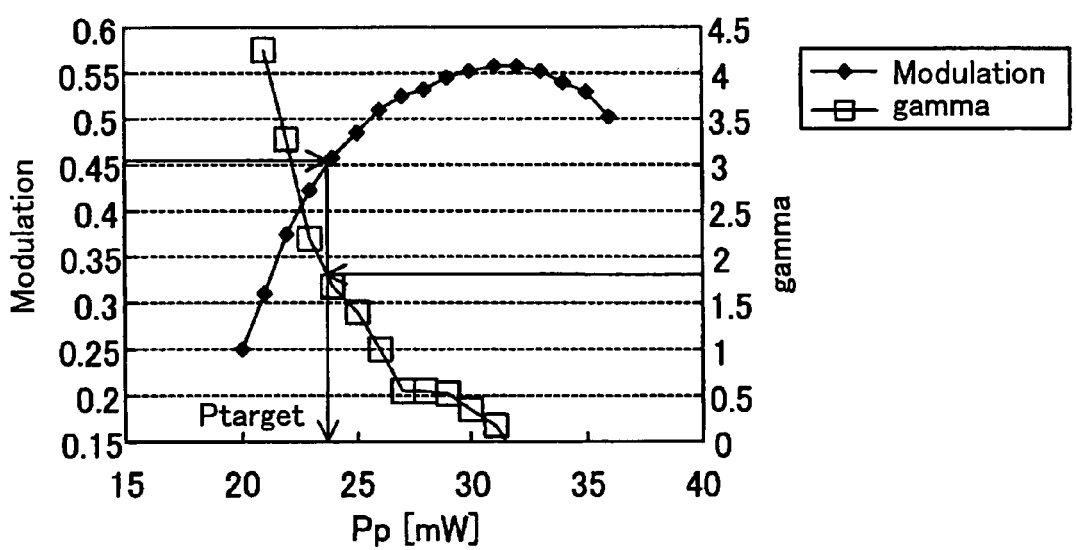
FIG. 17 is a graph illustrating data obtained in third and fourth exemplary applications of the present invention.
Figure 18:
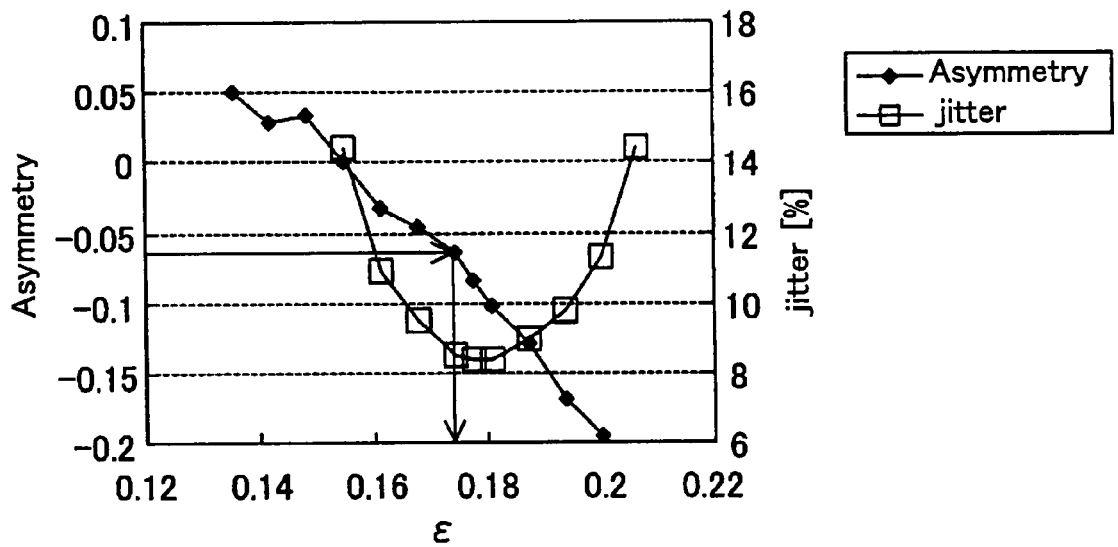
FIG. 18 is a graph illustrating data obtained in the third exemplary application.

In the present example, when Ttop=Tmp=0.2T, dTtop=0T, dTera=0.3T, and the 1T strategy is used to perform test writing on the first information layer 15*b*, a corresponding relationship between the modulation level and the recording power Pp as is illustrated in FIG. 17 is obtained. When the target modulation level and the multiplying coefficient are determined to be Mtarget=0.46 and ρ=1.29, then Ptarget=24 mW and Ppo=31.0 mW. When the recording power is fixed to the above optimum value recording power Ppo and ε is assigned to measure the asymmetry, data represented by FIG. 18 are obtained. When the target asymmetry is determined to be γtarget=−0.07, a suitable jitter value of 8.1% may be obtained at the corresponding erasing power value.

4. Fourth Application

The two-layer phase change type optical disk identical to that used in the third example is used in the present example, and test writing is performed on the first information layer 15b in a manner similar to that of the third example. In this way, a corresponding relationship between the gamma value and the recording power Pp as is illustrated in FIG. 17 is obtained. When the target gamma value and the multiplying coefficient are determined to be γtarget=1.7 and ρ=1.29, then Ptarget=24 mW, Ppo=31.0 mW, and a suitable jitter value of 8.1% may be obtained.

5. Fifth Application

In the present example, the thickness of the first lower protective layer b1 is arranged to be 75 nm, the thickness of the first recording layer b2 is arranged to be 7.5 nm, the thickness of the first upper protective layer b3 is arranged to be 5 nm, and the thickness of the first reflective layer b4 is arranged to be 7 nm. It is noted that other structural features of the two-layer phase change type optical disk used in the present example are identical to those of the optical disk used in the first example. It is noted that the light permeability of the first information layer 15b after the initialization process is performed thereon is 43.4%.

Figure 19:
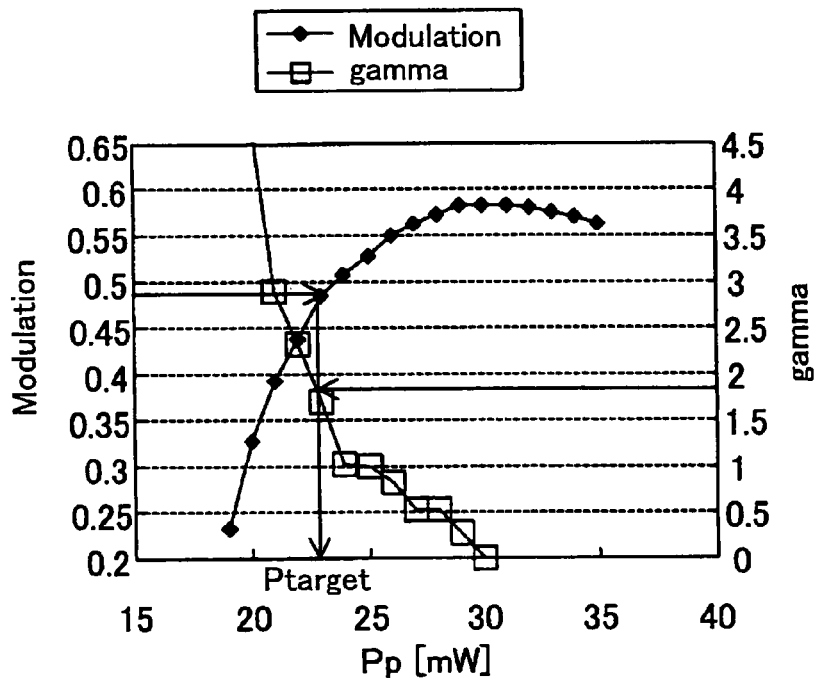
FIG. 19 is a graph illustrating data obtained in fifth and sixth exemplary applications of the present invention.
Figure 20:
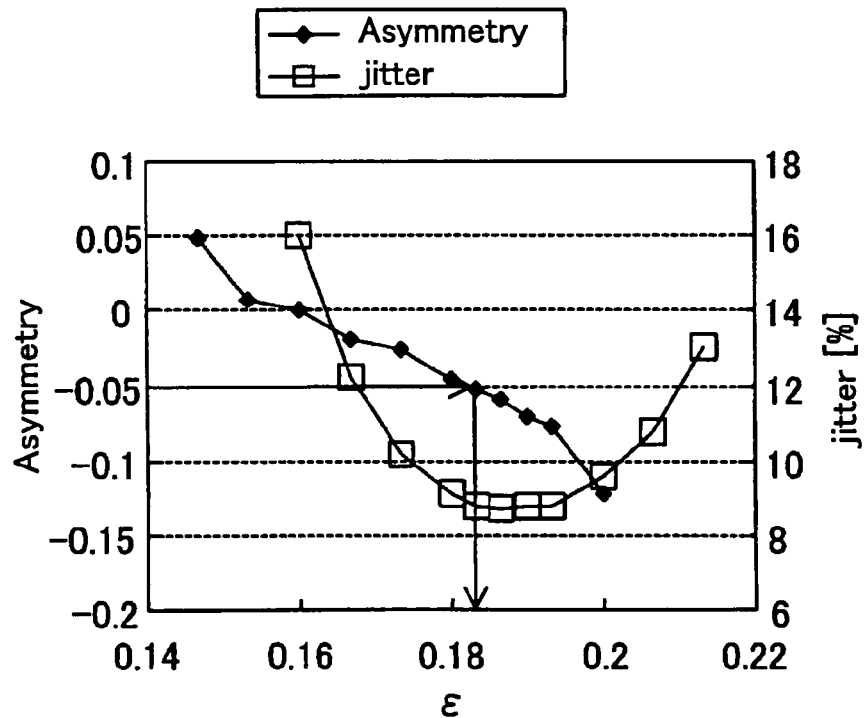
FIG. 20 is a graph illustrating data obtained in the fifth exemplary application.

In the present example, when Ttop=Tmp=0.2T, dTtop=0T, dTera=0.3T, and the 1T strategy is used to perform test writing on the first information layer 15b, a corresponding relationship between the modulation level and the recording power Pp as is illustrated in FIG. 19 is obtained. When the target modulation level and the multiplying coefficient are determined to be Mtarget=0.48 and ρ=1.26, then Ptarget=23 mW and Ppo=29.0 mW. When the recording power is fixed to the above optimum value recording power Ppo and ε is assigned to measure the asymmetry, data represented by FIG. 20 are obtained. When the target asymmetry is determined to be Atarget=−0.05, a suitable jitter value of 8.6% may be obtained at the corresponding erasing power value.

6. Sixth Application

In the present example, the two-layer phase change type optical disk identical to that used in the fifth example is used, and test writing is performed on the first information layer 15b in a manner similar to the fifth example. In this way, a corresponding relationship between the gamma value and the recording power Pp as is illustrated in FIG. 19 is obtained. When the target gamma value and the multiplying coefficient are determined to be γtarget=1.7 and ρ=1.26, then Ptarget=23 mW, Ppo=29.0 mW, and a suitable jitter value of 8.6% may be obtained as in the fifth example.

7. Seventh Application

In the present example, on a polycarbonate resin layer as the first substrate 15a with a diameter of 12 cm, a thickness of 0.6 mm, and one side having a continuous groove formed thereon at a track pitch of 0.74 μm, ZnS (80 mol %)-SiO₂ (20 mol %) with a thickness of 60 nm as the first lower protective layer b1, Ag₂In₄Sb₆₉Te₂₃Ge₂ with a thickness of 8 nm as the first recording layer b2, In₂O₃ with a thickness of 5 nm as the first upper protective layer b3, Cu₉₅Ag₅ with a thickness of 8 nm as the first reflective layer b4, and In₂O₃ (90 mol %)-ZnO (10 mol %) with a thickness of 60 nm as the heat diffusion layer b5 are deposited in this order in an Ar gas atmosphere through magnetron sputtering.

On a polycarbonate resin layer as the second substrate 15e with a diameter of 12 cm, a thickness of 0.6 mm, and one side having a continuous wobble groove formed thereon at a track pitch of 0.74 μm, Ag with a thickness of 120 nm as the second reflective layer d4, TiOC with a thickness of 4 nm as an interfacial layer, ZnS (80 mol %)-SiO₂ (20 mol %) with a thickness of 15 nm as the second upper protective layer d3, Ag₂In₄Sb₆₉Te₂₃Ge₂ with a thickness of 17 nm as the second recording layer d2, and ZnS (80 mol %)-SiO₂ (20 mol %) with a thickness of 140 nm as the second lower protective layer d1 are deposited in this order in an Ar gas atmosphere through magnetron sputtering. It is noted that adhesion and initialization processes are performed in a manner similar to that of the first example.

Figure 21:
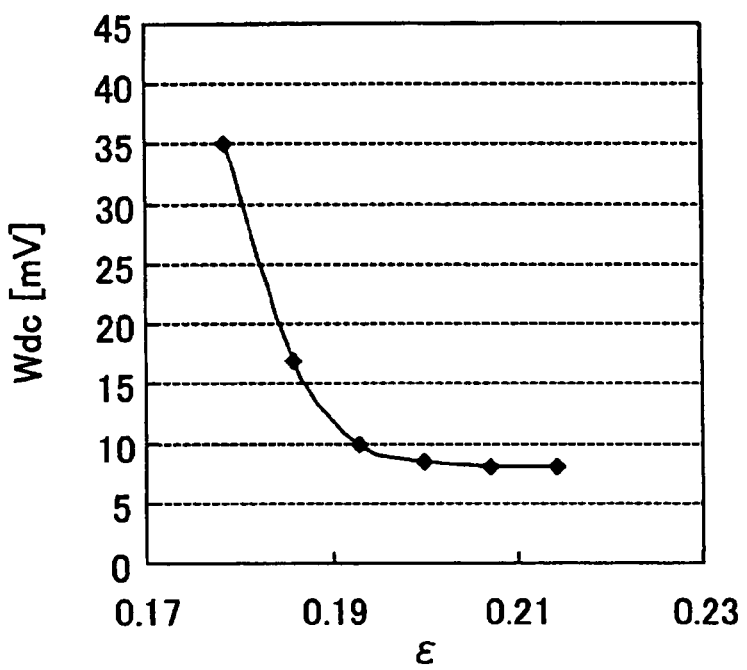
FIG. 21 is a graph illustrating a first set of data obtained in a seventh exemplary application of the present invention.
Figure 22:
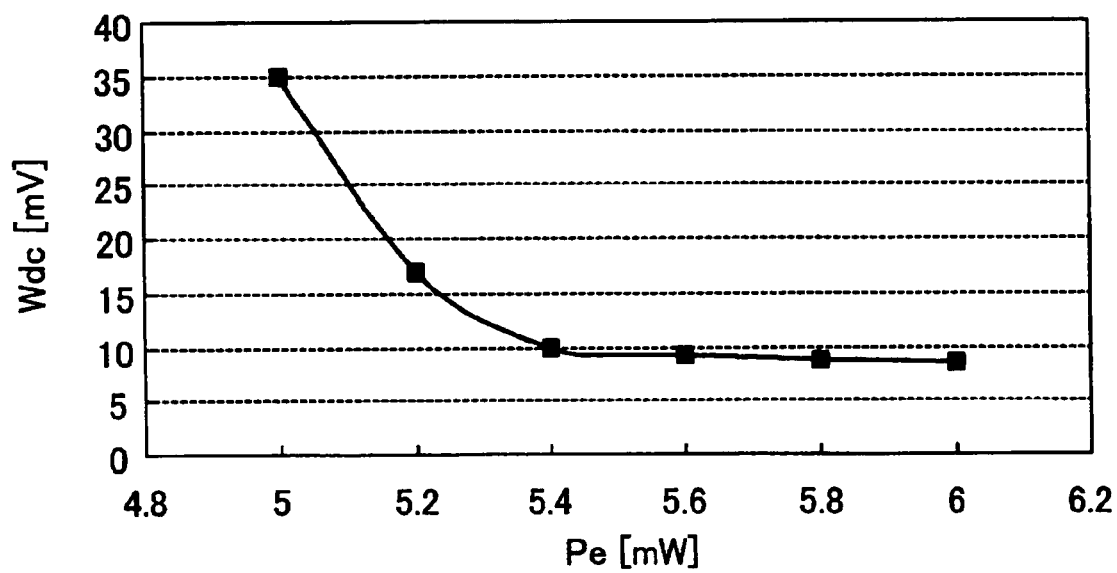
FIG. 22 is a graph illustrating a second set of data obtained in the seventh exemplary application.
Figure 23:
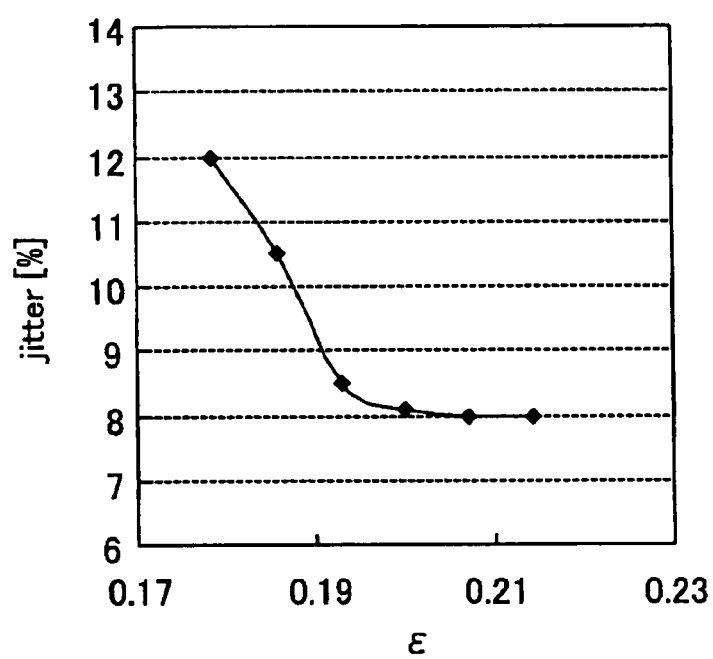
FIG. 23 is a graph illustrating a third set of data obtained in the seventh exemplary application.
Figure 24:
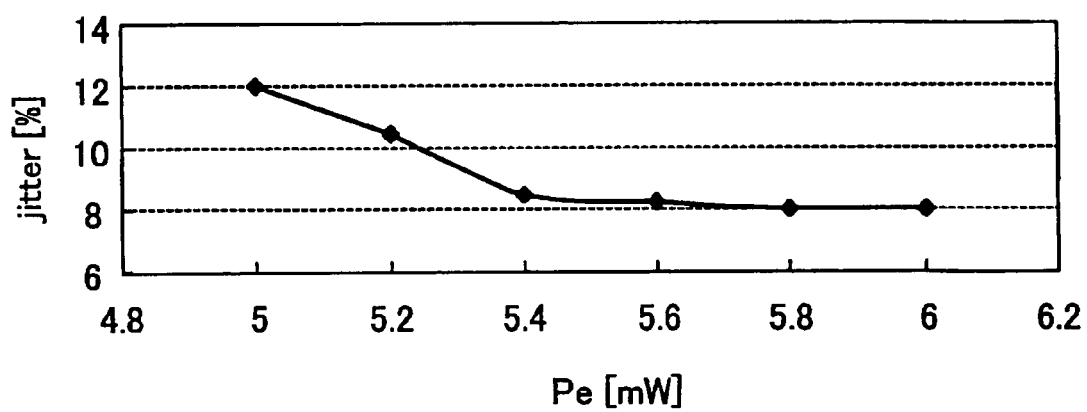
FIG. 24 is a graph illustrating a fourth set of data obtained in the seventh exemplary application.

In the present example, when Ttop=Tmp=0.22T, dTtop=0T, dTera=0.3T, and the 1T strategy is used to perform test writing on the first information layer 15b, Ppo=28 mW. In turn, test writing is performed by setting the recording power to Ppo (=28 mW), and DC erasure is performed on the test writing area while changing the erasing power Pe determined by ε=0.196 within a predetermined range ±10% of the determined erasing power Pe. Then, the amplitude Wdc of the sum signal of the output signal from the light receiver PD obtained from the light reflected from the test writing area is measured. In this way, data represented by FIGS. 21 and 22 may be obtained. It is noted that the amplitude Wo of the sum signal corresponding to the unrecorded portion of the writing area is 8 mV. In the present example, given that the corresponding erasing power for ε(=0.186) in a case where the signal amplitude Wdc is equal to 2×Wo (α=2) is denoted as Pedc (=5.22 mW), the value obtained by multiplying the erasing power Pedc by 1.1 (β=1.1) is set as the optimum erasing power Peo (=5.7 mW (ε=0.204)). Upon repeatedly performing ten recording operations on plural tracks under these conditions, a suitable jitter value of 8% may be obtained as is shown in FIGS. 23 and 24.

Figure 25:
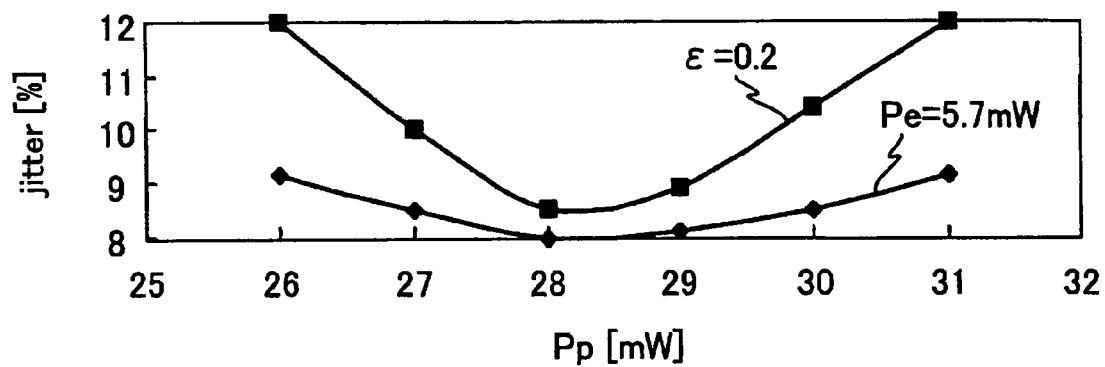
FIG. 25 is a graph illustrating a fifth set of data obtained in the seventh exemplary application.

FIG. 25 illustrates the respective recording power margins in a case where Pe is constant (i.e., Pe=5.7), referred to as condition A, and in a case where Pe is equal to Pp×ε (i.e., ε=0.2), referred to as condition B. As can be appreciated from this drawing, jitter is exacerbated when the recording power is deviated from the optimum value recording power Ppo (=28 mW) in both conditions A and B.

8. Eighth Application

Figure 26:
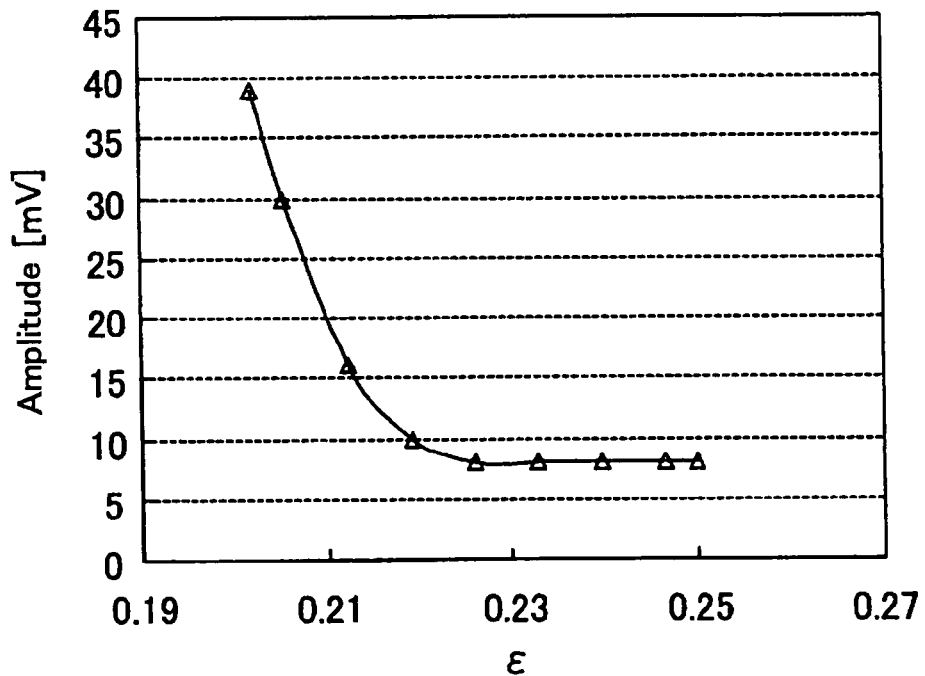
FIG. 26 is a graph illustrating a first set of data obtained in an eighth exemplary application of the present invention.
Figure 27:
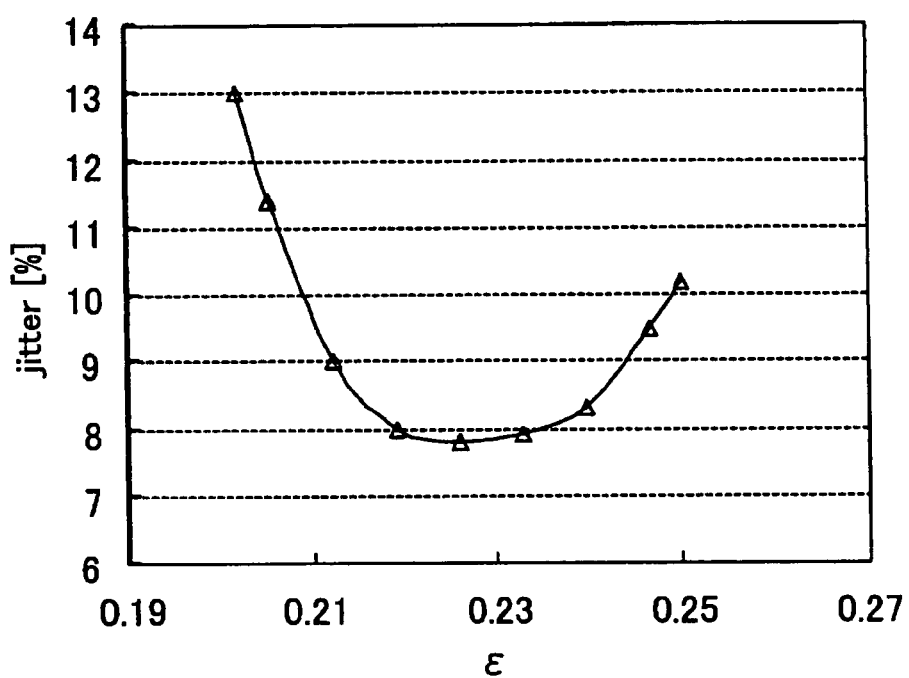
FIG. 27 is a graph illustrating a second set of data obtained in the eighth exemplary application.

In the present example, a two-layer phase change type optical disk identical to that used in the first example is used. When Ttop=Tmp=0.188T, dTtop=0.6T, dTera=0.3T, and the 1T strategy is used to perform test writing on the first information layer 15b, Ppo=29.2 mW. In turn, test writing is performed by setting the recording power to Ppo (=29.2 mW), and DC erasure is performed on the test writing area while changing the erasing power Pe determined by ε=0.226 within a predetermined range ±10% of the determined erasing power Pe. Then, the amplitude Wdc is measured to obtain data represented by FIG. 26. It is noted that the amplitude Wo of the sum signal corresponding to the unrecorded portion of the writing area is 8 mV. In the present example, given that the corresponding erasing power for ε (=0.212) in a case where the signal amplitude Wdc is equal to 2×Wo (α=2) is denoted as Pedc (=5.22 mW), the value obtained by multiplying the erasing power Pedc by 1.1 (β=1.1) is set as the optimum erasing power Peo (=5.7 mW (ε=0.204)). Upon repeatedly performing ten recording operations on plural tracks under these conditions, a suitable jitter value of 7.8% may be obtained as is shown in FIG. 27.

9. Ninth Application

Figure 35:
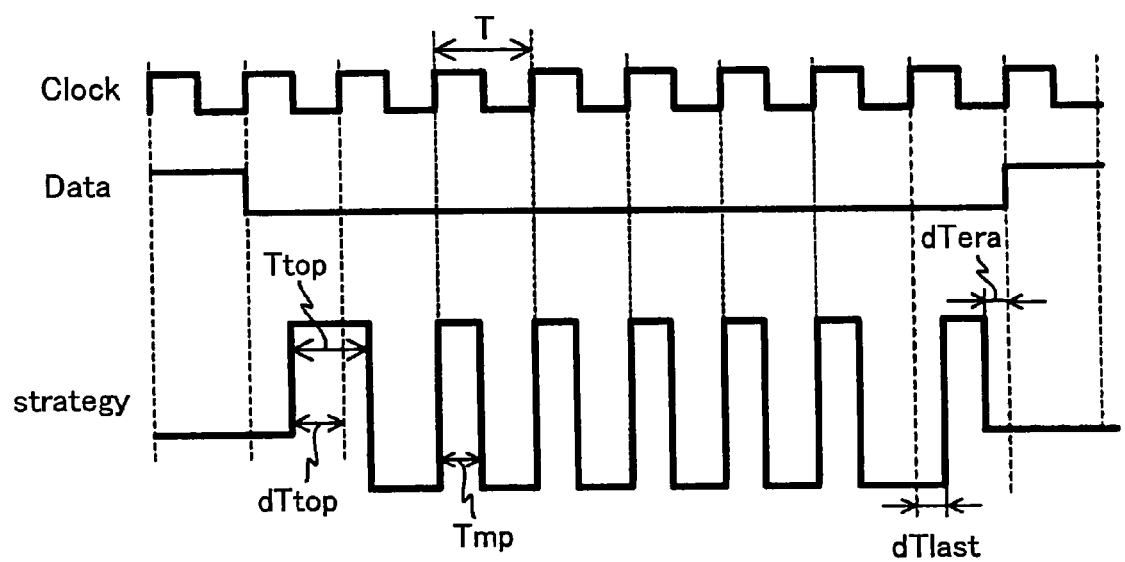
FIG. 35 is another diagram illustrating the 1T strategy parameter of FIG. 14 in greater detail.

In the present example, a two-layer phase change type optical disk is used in which the first recording layer b2 is made of Ag₀.₂In₃.₅Sb₆₉.₈Te₂₂Ge₄.₅ with a thickness of 7.5 nm, the first upper protective layer has a thickness of 3 nm, and the first reflective layer b4 has a thickness of 7.5 nm. It is noted that other structural features of the two-layer phase change type optical disk used in the present example are identical to those of the optical disk used in the first example. Test writing is performed on the first information layer 15b under the conditions Ttop=Tmp=0.188T, dTtop=0.375T, dTlast=−0.438T, dTera=0.375T, and using the 1T strategy. It is noted that the negative sign "−" in front of the value dTlast signifies that the signal is temporally delayed with respect to the standard clock (see FIG. 35).

Figure 36:
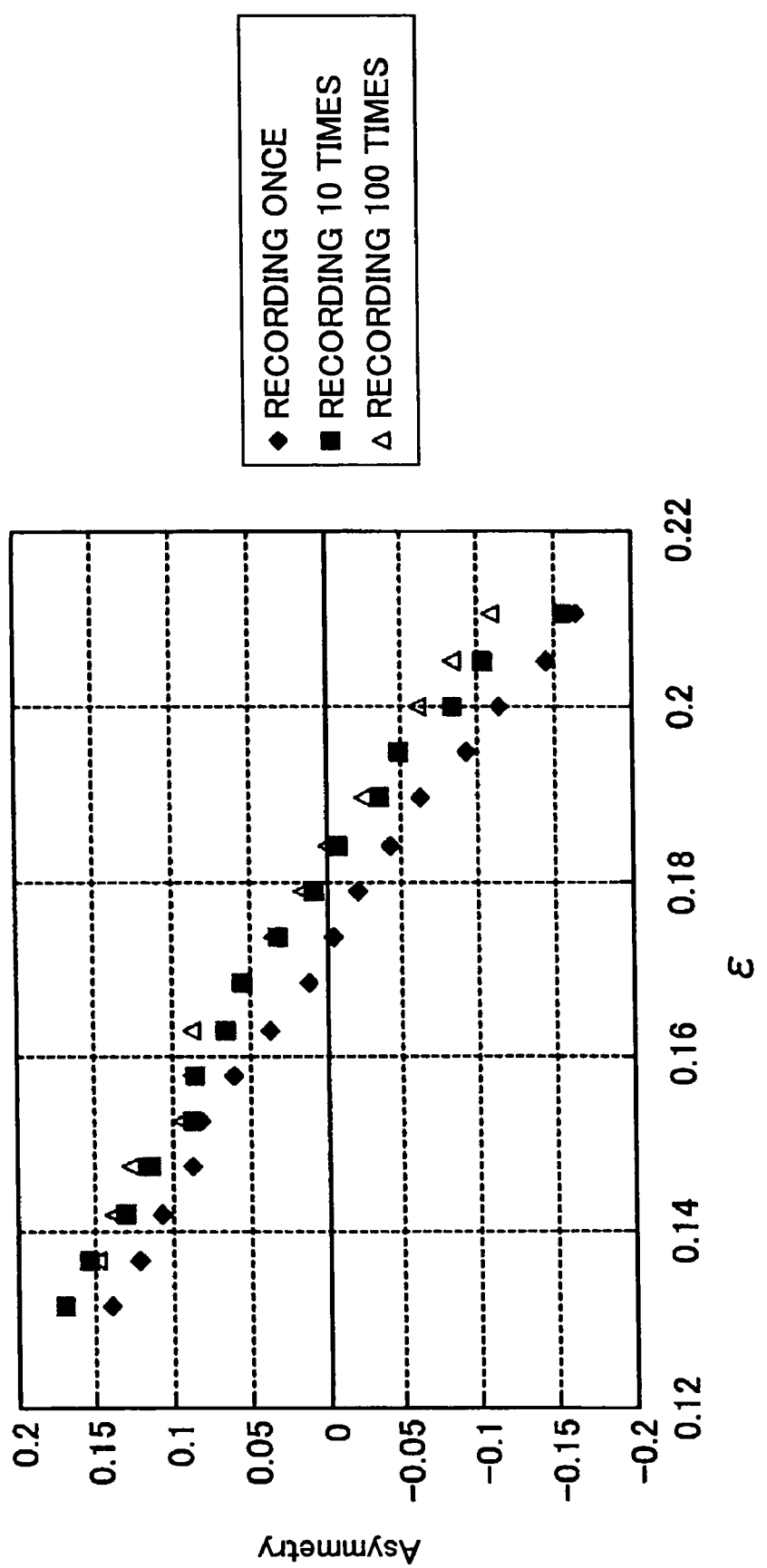
FIG. 36 is a graph illustrating differences in asymmetries depending on differing erasing powers in cases where recording is performed on a power calibration area once, ten times, and one hundred times, respectively.
Figure 37:
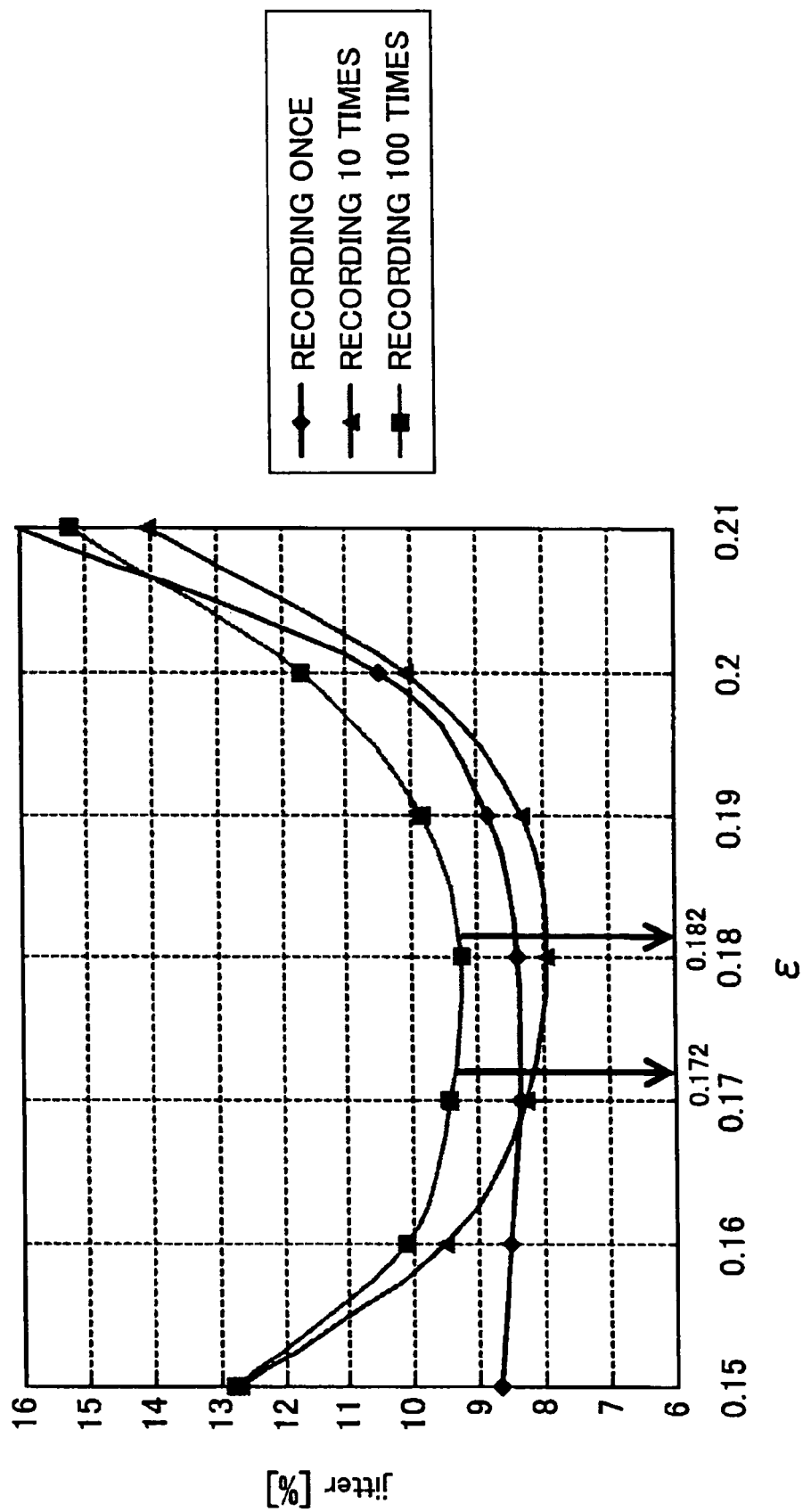
FIG. 37 is a graph illustrating recording characteristics (jitter) measured for an optimum erasing power at an area other than the power calibration area.

A recording operation is performed once on three tracks within the test writing area (PCA) using the optimum recording power Ppo (=38 mW) after which an erase operation is performed on the recorded area using an erasing power Pe calculated based on a value ϵ (=0.182) formatted (recorded) on a predetermined area of the disk beforehand. Then, recording may be performed on the tracks once, ten times, or one hundred times, for example, while sequentially changing the erasing power Pe to measure the resulting asymmetry in the recording operation. FIG. 36 is a graph showing the measurement results obtained by performing recordings on the testing area once, ten times, and one hundred times, respectively, in the recording operation. As can be appreciated from FIG. 36, differences in asymmetry are created depending on the number of recordings performed on the test writing area in the recording operation. FIG. 37 is a graph indicating the respective jitters resulting from performing a recording operation on an area other than the testing area using a corresponding ϵ value for a case in which the asymmetry is substantially equal to 0 (zero). As can be appreciated from FIG. 37, desirable jitter values may be obtained when Ppo=38 mW and ϵ=0.172 and 0.182 (Peo=6.5 mW and 6.9 mW) regardless of the number of recordings performed on the testing area in the recording operation for obtaining a suitable ϵ value.

In the above-described exemplary applications, a desirable jitter value may be obtained, and high quality recording may be stably performed on the optical disk.

Figure 28:
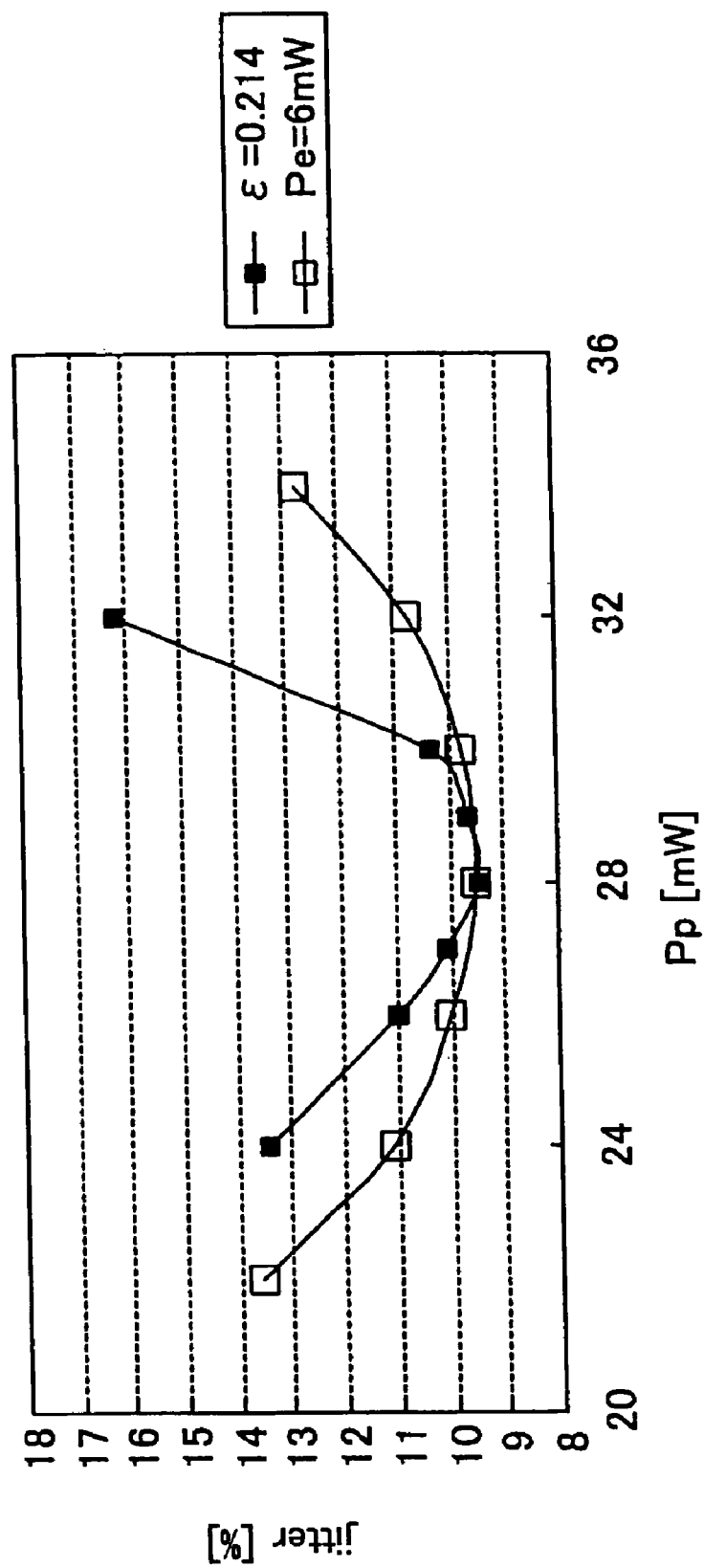
FIG. 28 is a graph illustrating differences in jitter characteristics in 1T strategy recording depending on differing erasing power setting conditions.
Figure 29:
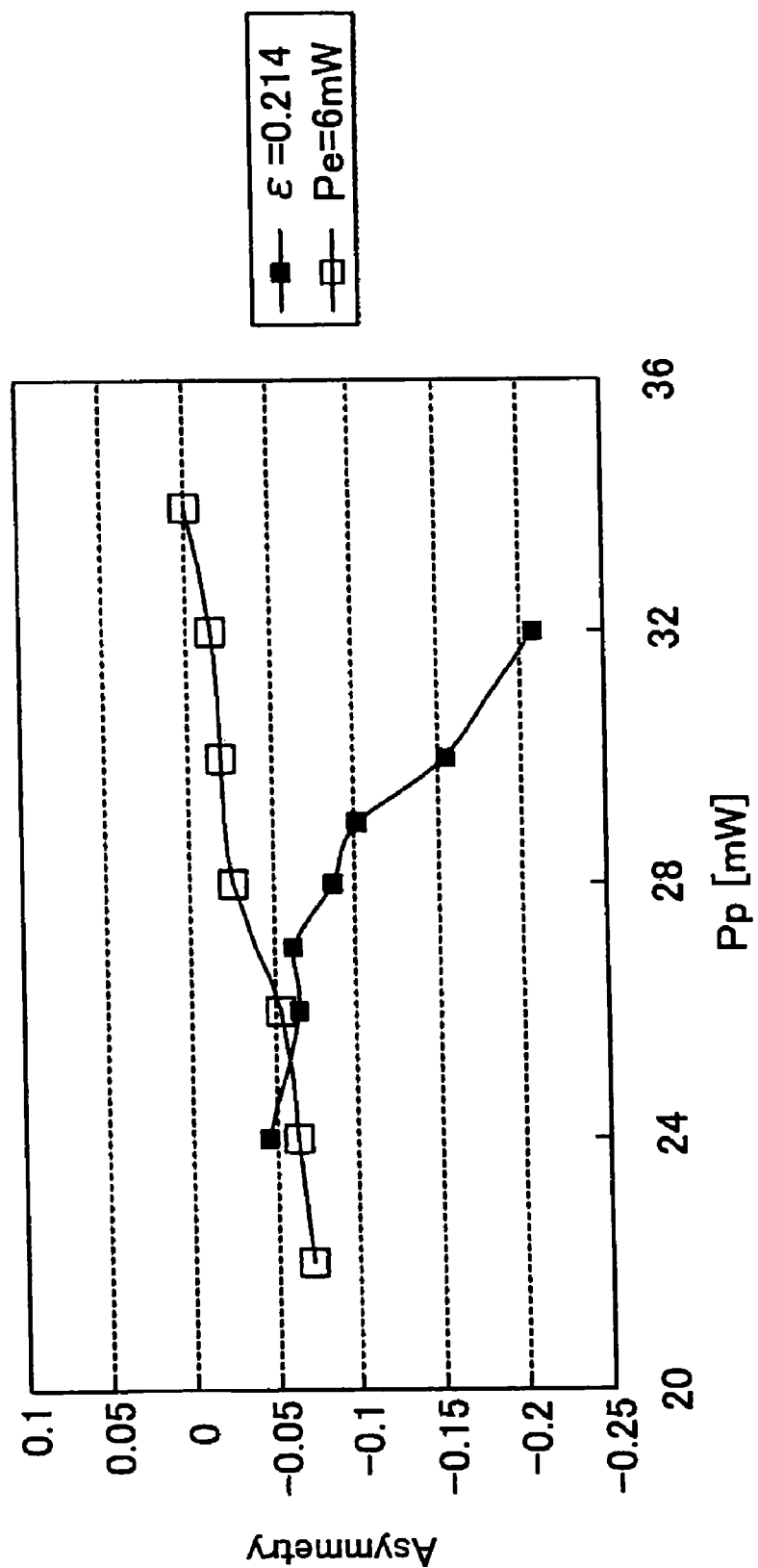
FIG. 29 is a graph illustrating differences in asymmetry characteristics in 1T strategy recording depending on differing erasing power setting conditions.

FIG. 28 is a graph indicating respective recording power margins for cases A and B when recording is successively performed on the first information layer 15b ten times using the 1T strategy, case A corresponding to a case in which Pe is constant (=6 mW), and case B corresponding to a case in which Pe equals Pp×ϵ (ϵ=0.214). FIG. 29 is a graph indicating the respective asymmetries obtained in cases A and B. As can be appreciated from these drawings, when the recording power Pp deviates from the optimum recording power Ppo (=28 mW) jitter is degraded to a greater extent in case B compared to case A. Also, when the recording power Pp is greater than the optimum recording power Ppo (=28 mW), asymmetry is degraded at a greater extent in case B compared to case A.

Figure 30:
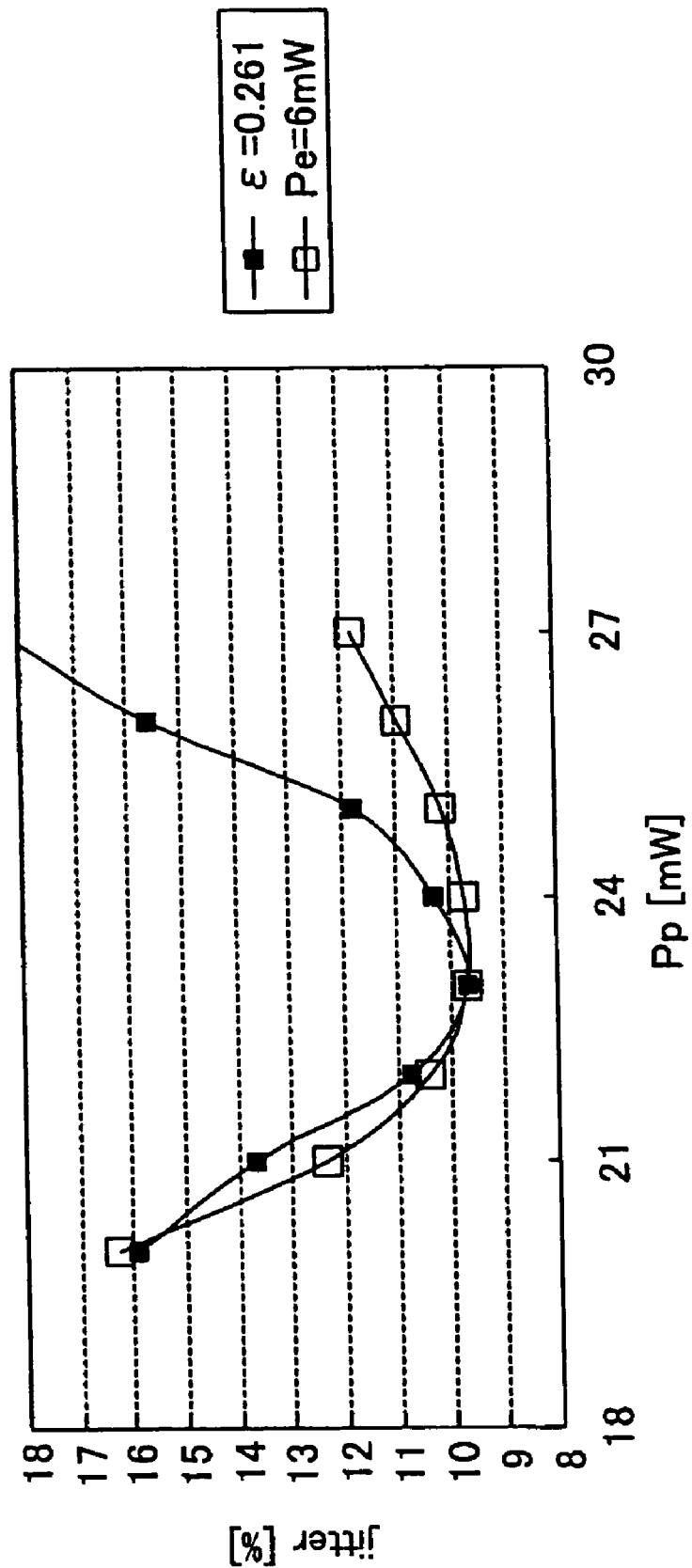
FIG. 30 is a graph illustrating differences in jitter characteristics in 2T strategy recording depending on differing erasing power setting conditions.
Figure 31:
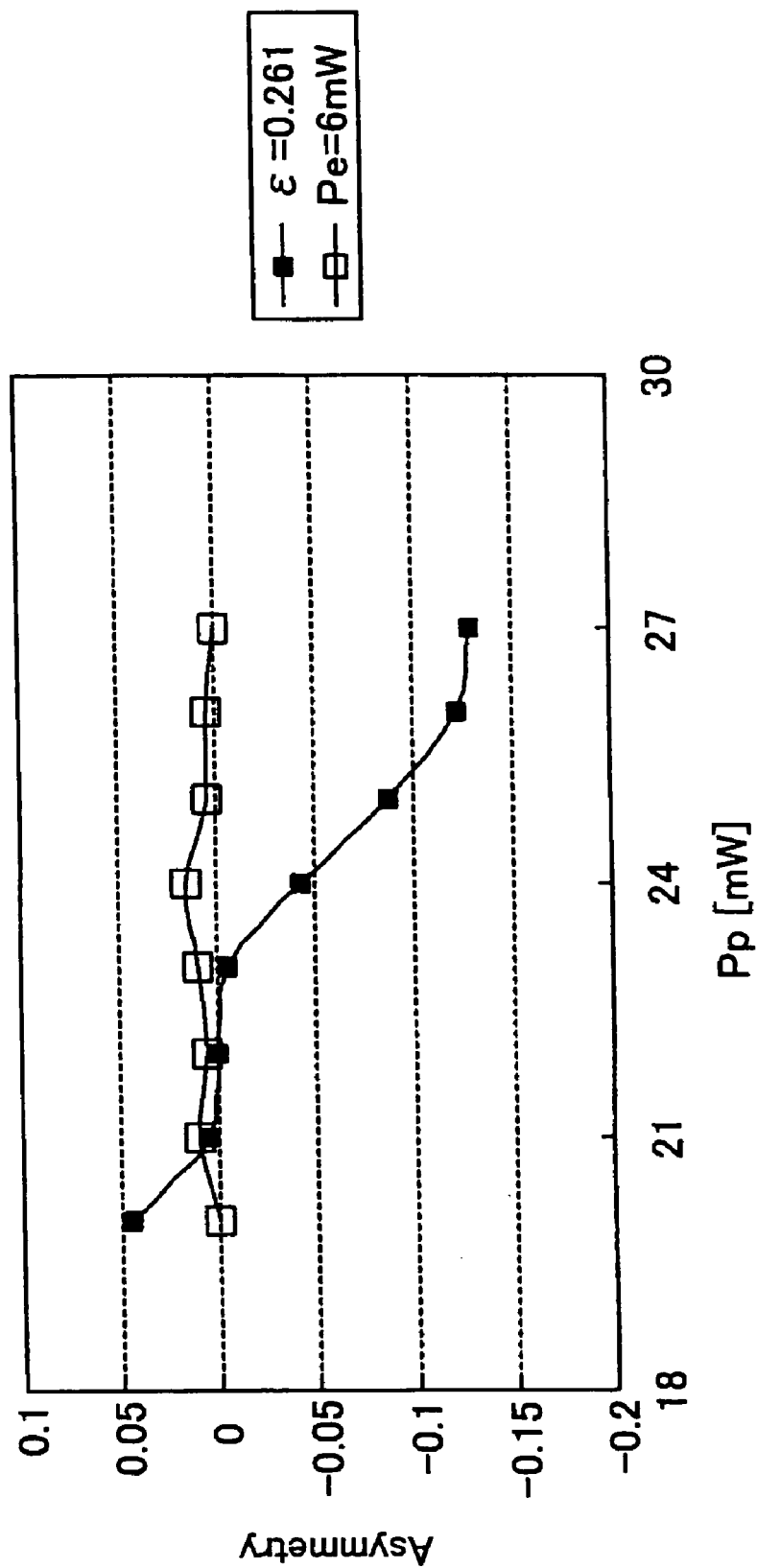
FIG. 31 is a graph illustrating differences in asymmetry characteristics in 2T strategy recording depending on differing erasing power setting conditions.

FIG. 30 is a graph indicating respective recording power margins for cases A and B when recording is successively performed on the first information layer 15b ten times using the 2T strategy, case A corresponding to a case in which Pe is constant (=6 mW), and case B corresponding to a case in which Pe equals Pp×ϵ (ϵ=0.214). FIG. 31 is a graph indicating the respective asymmetries obtained in cases A and B. As can be appreciated from these drawings, the asymmetry and jitter are degraded to a greater extent in case B compared to case A when the recording power Pp is deviated from the optimum recording power Ppo as in the example using the 1T strategy described above.

As is described above, regardless of whether the 1T or the 2T strategy is used, a wider recording power margin may be secured and desirable recording quality may be obtained in a case where recording is performed with a constant erasing power Pe compared to a case where the recording is performed under the condition Pe=Pp×ϵ. In other words, when a fixed optimum erasing power Peo is determined, stable information recording may be performed even in a case where there is a slight deviation in the optimum recording power Ppo, for example (see FIGS. 28 and 30).

Figure 32:
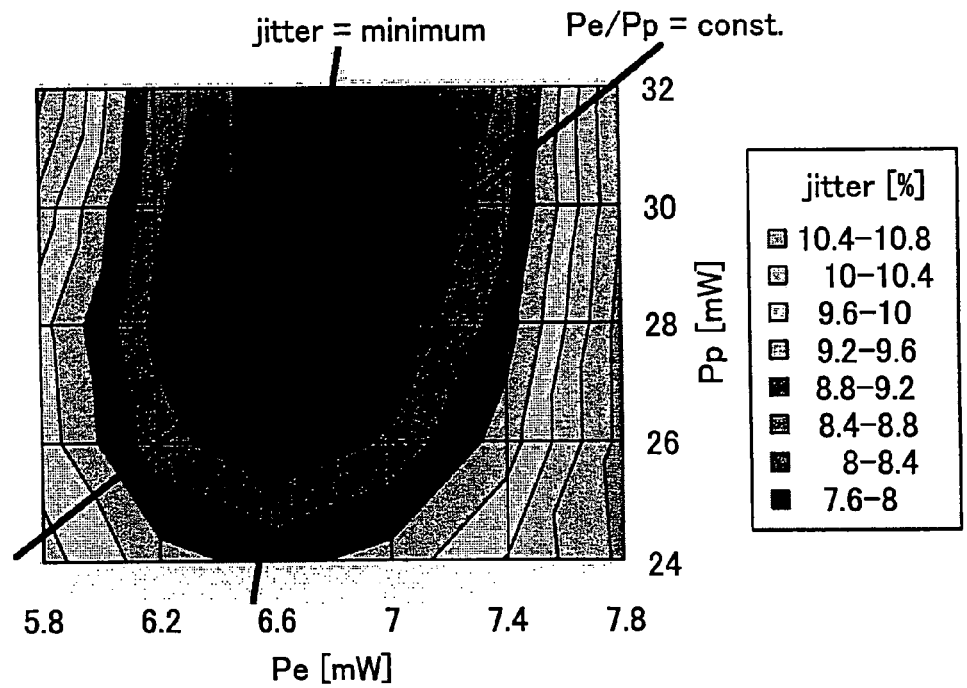
FIG. 32 is a graph illustrating a corresponding relationship between an erasing power, a recording power, and jitter.
Figure 33:
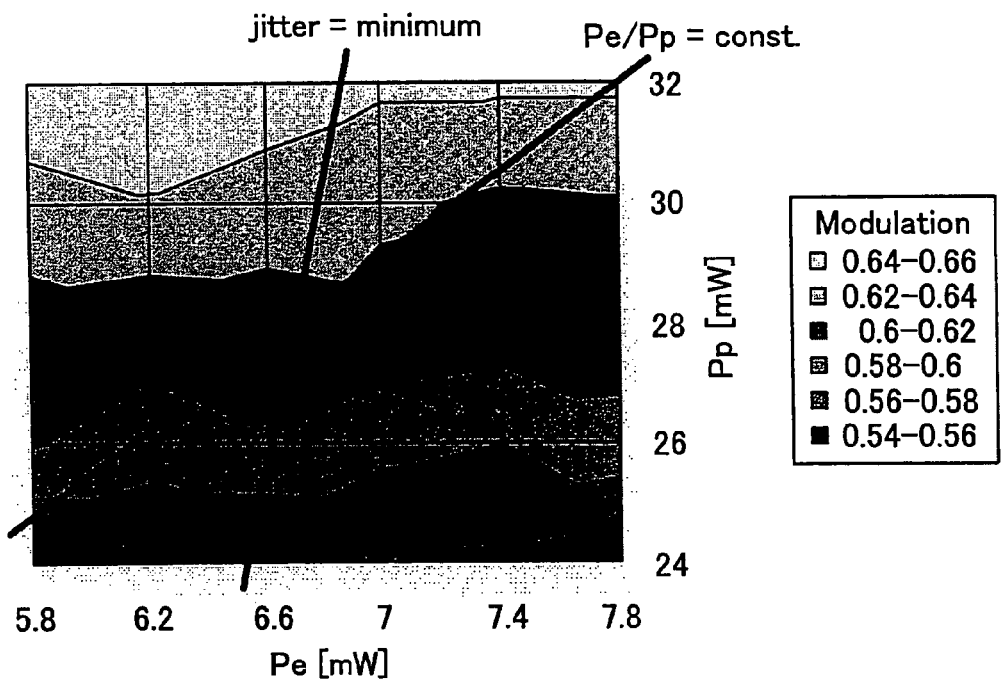
FIG. 33 is a graph illustrating a corresponding relationship between an erasing power, a recording power, and a modulation level.
Figure 34:
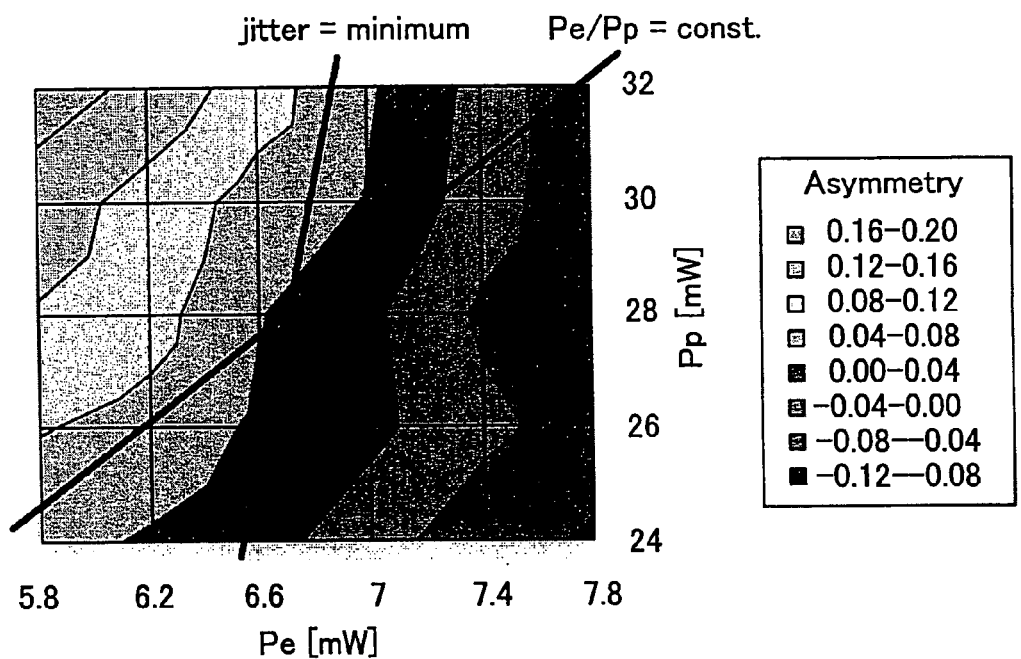
FIG. 34 is a graph illustrating a corresponding relationship between an erasing power, a recording power, and asymmetry.

FIG. 32 is a graph indicating a corresponding relationship between the recording power Pp, the erasing power Pe, and jitter. As is shown in this drawing, the points at which Pe equals Pp×ϵ and the points at which minimum jitter is realized do not correspond. FIG. 33 is a graph indicating a corresponding relationship between the recording power Pp, the erasing power Pe, and the modulation level. FIG. 34 is a graph indicating a corresponding relationship between the recording power Pp, the erasing power Pe, and asymmetry.

As can be appreciated from the above descriptions, in the optical disk apparatus 20 according to one embodiment of the present invention, the CPU 40 and the programs executed by the CPU 40 realize an optimum power obtaining unit according to one embodiment of the present invention. However, in other embodiments, at least a part of the processes realized by the programs executed by the CPU 40 may be realized by hardware, or all the processes may be realized by hardware, for example.

Also, in the above illustrated embodiment, the encoder 25, the laser control circuit 24, and the optical pickup device 23 realize a recording unit according to one embodiment of the present invention.

Also, in the above illustrated embodiment, the flash memory 39 realizes a computer-readable medium according to one embodiment of the present invention that stores various programs including a program for executing the process steps illustrated in FIGS. 5 and 6, FIGS. 9 and 10, or FIGS. 12 and 13 (power determining program), for example. It is noted that such a program may be embodied as a computer program product according to an embodiment of the present invention.

Also, the recording process steps described above may realize a power determining method and a recording method according to embodiments of the present invention.

According to one embodiment, in the above-described optical disk apparatus 20, first, test writing is performed on the optical disk 15 by changing the recording power and the erasing power while recording test data in a manner such that the ratio ϵ between the recording power and the erasing power equals a predetermined value. Then, based on the test writing result, a recording power corresponding to a target modulation level Mtarget (predetermined modulation level) or a target gamma value γtarget (predetermined gamma value) is obtained after which the obtained recording power is multiplied by a multiplying coefficient ρ (predetermined coefficient) to obtain an optimum recording power Ppo.

Then, the optimum recording power Ppo is set as the recording power to be used, and test writing is preformed by changing the erasing power Pe while recording the test data. Then, based on the test writing result, an erasing power Peo corresponding to a target asymmetry (predetermined asymmetry) is obtained, and the obtained erasing power Peo is set as the optimum erasing power.

Alternatively, after test data are recorded on the test writing area of the optical disk 15 using the optimum recording power Ppo, the recorded test data are erased from the test writing area using differing erasing powers. Then, based on a sum signal amplitude Wdc obtained from the test writing area, an erasing power Pedc corresponding to α×(sum signal amplitude Wo obtained from unrecorded area) is obtained, and β×Pedc is set as the optimum erasing power Peo.

Then, the obtained optimum recording power Ppo and optimum erasing power Peo are used to record user data on the optical disk 15. In this way, high quality recording may be stably performed on an optical disk having plural rewritable recording layers. It is noted that by applying the present embodiment, advantageous effects may be obtained particularly in a case where the accessing recording layer corresponds to the first recording layer b2 that is positioned closer to the plane of incidence of the laser beam emitted from the light source unit 51.

It is noted that in the above descriptions, a two-layered phase change type optical recording medium is used as a single-sided multilayer optical disk that has light irradiated thereon from one side. The two-layered phase change type optical recording medium may be created by layering two information layers each including at least a recording layer and a metal reflective layer, and bonding the two information layers together with UV curable resin, for example. The bonding portion for realizing the bond between the information layers may correspond to an isolation layer (referred to as "intermediate layer" in the above descriptions) that optically isolates the two information layers. The information layer at a near side with respect to the light irradiating side of the optical disk (e.g., first information layer) is preferably arranged to be made of a suitable material with a suitable thickness to enable sufficient light (laser beam used for recording/reproducing information) to penetrate therethrough to reach the information layer positioned at a further side with respect to the light irradiating side (e.g., second information layer).

It is noted that in the two-layer phase change type optical recording medium, information may not be adequately recorded/reproduced on/from the recording layer of the information layer at the further side (second information layer) unless a sufficient portion of the irradiated laser beam can penetrate through the information layer at the near side (first information layer). In this respect, in the first information layer, a thin semi-transparent reflective layer is preferably used as the reflective layer, and a transparent material having high heat conductivity is preferably arranged thereon. On the other hand, the second information layer does not necessarily have to have high light permeability, and thereby, a relatively thick metal reflective layer may be used as the reflective layer of the second information layer as in a conventional single layer optical recording medium, for example.

It is noted that a recording operation is realized on a recording layer of a phase change type optical recording medium by irradiating a laser beam on a phase change recording material, rapidly cooling the recording material, and changing the phase of the recording material from a crystalline state to an amorphous state to create a mark. An erasing operation is realized by irradiating continuous light on the recording material and slowly cooling the recording material to realize a crystalline state.

In a two-layered phase change type optical recording medium, the second information layer is arranged to include a metal layer with high heat conductivity such as an Ag layer so that a layer with good heat dissipation characteristics may be realized and formation/erasure of an amorphous mark may be accurately performed. The first information layer of a two-layer phase change type optical recording medium preferably includes a relatively thin semitransparent metal layer (e.g., approximately 10 nm) in order to realize good light permeability. Also, the first information layer preferably includes a transparent heat dispersion layer arranged on the semitransparent metal layer in order to improve heat dissipation characteristics. In this way, recording and erasure may be facilitated. However, the heat dissipation characteristics of the first information layer is still inferior to that of the second information layer having a metal reflective layer with an adequate thickness. Specifically, waste heat may not be easily dissipated so that recording or erasure may not be smoothly performed (e.g., see FIG. 38).

Figure 38:
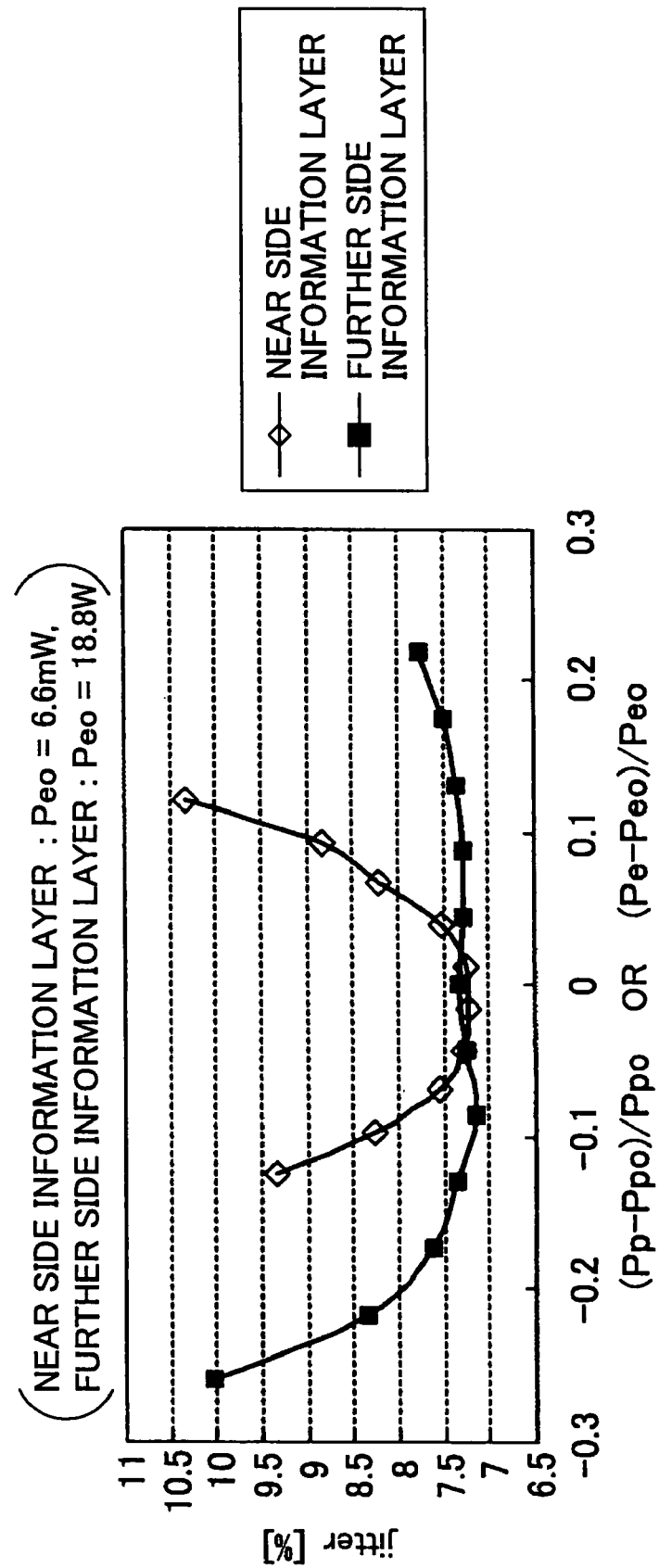
FIG. 38 is a graph illustrating differences in recording characteristics between a near side information layer and a further side information layer of the optical disk of the present embodiment.

FIG. 38 is a graph indicating jitters at the near side information layer and the further side information layer in a case where the multi-pulse recording method is applied to a rewritable optical recording medium, wherein a mark is formed by a multi-pulse alternating between the recording power Pp and the bias power Pb through intensity modulation of the light emitting power, the mark is erased (a space is formed) by irradiating a continuous light with the erasing power Pe, and the ratio between the recording power Pp and the erasing power Pe (Pe/Pp=$\epsilon$) is arranged to be constant. In the present example, it is assumed that $\epsilon$=0.18 at the near side information layer (first information layer), and $\epsilon$=0.409 at the further side information layer (second information layer).

As can be appreciated from the example of FIG. 38, the power range (power margin) at which good jitter characteristics may be obtained differ between the first information layer and the second information layer owing to differences in their layer structures, particularly, the difference in the thicknesses of their metal layers. Specifically, in FIG. 38, a wider power margin is obtained in the second information layer compared to that of the first information layer. In this case, in the second information layer, once the optimum recording power Ppo is determined, the optimum erasing power Peo may be simultaneously determined by the formula Peo=$\epsilon$× Ppo. However, as for the first information layer with a narrower power margin, good recording characteristics may not be achieved by merely determining the optimum recording power Ppo. Accordingly, in an embodiment of the present invention, the ratio $\epsilon$ is changed to obtain the optimum erasing power Peo.

It is noted that the optical disk 15 according to an embodiment of the present invention has setting information for obtaining the optimum recording power and the optimum erasing power preformatted therein so that the optimum recording power and the optimum erasing power may be speedily and accurately obtained.

Also, it is noted that in the above descriptions, the optical disk 15 of the present embodiment has been described as a DVD type optical disk. However, the present invention is not limited to such an embodiment, and may equally be applied as other types of optical disks such as a next generation optical disk utilizing light at 405 nm wavelength, for example.

Also, it is noted that in the above-described embodiments of the present invention, the optical disk 15 is described as having two recording layers (information layers). However, the present invention is not limited to such an embodiment, and three or more recording layers (information layers) may be included in an optical disk applied in the present invention. In this case, advantageous effects may be obtained particularly when the accessing recording layer corresponds to a recording layer other than that positioned furthest from the plane of incidence of the laser beam emitted from the light source unit 51.

Also, it is noted that in the above descriptions, a power determining program according to an embodiment of the present invention is stored in the flash memory 39; however, such a program may be stored in other types of storage media such as a CD, a magneto-optical disk, a DVD, a memory card, a USB memory, or a flexible disk. In this case, the program according to the present embodiment may be loaded in the flash memory 39 via a reproducing apparatus (or a dedicated interface) adapted for the corresponding storage medium. In another example, the program of the present embodiment may be transferred to the flash memory 39 via a network such as a LAN, an Intranet, or the Internet. In other words, the program of the present embodiment may be stored or carried in any medium to be loaded in the flash memory 39.

Also, it is noted that in the above-described embodiments, the optical pickup device 23 includes one semiconductor laser; however, the present invention is not limited to such an embodiment, and for example, plural semiconductor lasers that emit light fluxes with differing wavelengths may be included in the optical pickup device. In this case, at least one of a semiconductor laser that emits a light flux at a wavelength of approximately 405 nm, a semiconductor laser that emits a light flux at a wavelength of approximately 660 nm, and a semiconductor laser that emits a light flux at a wavelength of approximately 780 nm may be included in the optical pickup device, for example. In other words, an optical disk apparatus according to one embodiment of the present invention may be an optical disk apparatus adapted for plural types of optical disks conforming to differing standards. In this case, the optical disk apparatus may be adapted for at least a single-sided multilayer optical disk having plural rewritable recording layers.

As can be appreciated from the above descriptions, embodiments within the scope of the present invention include a power determining method, a recording method, an optical disk apparatus, a single-sided multilayer optical disk, and a power determining program. The power determining method according to an embodiment of the present invention may be suitably applied to determine an appropriate light emitting power upon recording information on an optical disk having plural rewritable recording layers. The recording method and the optical disk apparatus according to embodiments of the present invention may enable high quality recording to be stably performed on an optical disk having plural rewritable recording layers. The single-sided multilayer optical disk according to an embodiment of the present invention may be a suitable medium to which the power determining method of the present embodiment may be applied. The power determining program according to an embodiment of the present invention may enable an optical disk apparatus to stably perform high quality recording on an optical disk having plural rewritable recording layers. The power determining program may be embodied in any computer-readable medium for carrying or having computer-executable instructions or data structures stored therein. The power determining program may also be embodied in a computer program product including such a computer-readable medium. The computer-readable medium can be any available medium which can be accessed by a general purpose or a special purpose computer. By way of example, and not limitation, such a computer-readable medium can comprise a physical storage medium such as a RAM, a ROM, an EEPROM, a CDROM, other optical disk storage devices, other magnetic storage devices, or any other medium which can be used to carry or store desired program code means in the form of computer-executable instructions or data structures and which can be accessed by a general purpose or special purpose computer. Such a medium may include a wireless carrier signal, for example. When information is transferred or provided over a network or other communications connection (either hardwired, wireless, or combinations thereof) to a computer, the computer properly views the connection as a computer-readable medium. Thus, any such connection is properly termed a computer-readable medium. Combinations of the above should also be included within the scope of the computer-readable medium. Computer-executable instructions comprise, for example, instructions and data which cause a general purpose computer, a special purpose computer, or a processing device to perform a certain function or a group of functions.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing dates of Japanese Patent Application No. 2005-285715 filed on Sep. 30, 2005, Japanese Patent Application No. 2005-338801 filed on Nov. 24, 2005, and Japanese Patent Application No. 2005-364190 filed on Dec. 19, 2005, the entire contents of which are hereby incorporated by reference.

The invention claimed is:

1. A power determining method for determining a light emitting power of a light source upon recording information on an optical disk having a plurality of rewritable recording layers, the method comprising a step of:
   obtaining an optimum erasing power with respect to an optimum recording power by recording test data on the optical disk,
   wherein the step of obtaining the optimum erasing power includes erasing the test data using differing erasing powers after recording the test data on the optical disk using the optimum recording power, and obtaining the optimum erasing power based on an amplitude of a signal obtained from an area of the optical disk from which the test data are erased, and
   wherein the optimum erasing power is equal to an erasing power used when the amplitude of the signal obtained from the area from which the test data are erased establishes a predetermined relationship with an amplitude of a signal obtained from an unrecorded area of the optical disk.

2. The power determining method as claimed in claim 1, wherein
   the step of obtaining the optimum erasing power includes recording the test data using the optimum recording power while changing an erasing power being used, obtaining an erasing power corresponding to a predetermined asymmetry based on results of recording the test data, and setting the obtained erasing power as the optimum erasing power.

3. The power determining method as claimed in claim 1, further comprising steps to be performed before the step of obtaining the optimum erasing power which steps include:
   performing test writing on the optical disk while changing a recording power and an erasing power being used in a manner such that a ratio between the recording power and the erasing power being used is equal to a predetermined value;
   obtaining a recording power corresponding to a predetermined modulation level based on results of the test writing; and
   obtaining the optimum recording power by multiplying the obtained recording power by a predetermined coefficient.

4. The power determining method as claimed in claim 1, further comprising steps to be performed before the step of obtaining the optimum erasing power which steps include:
   performing test writing on the optical disk while changing a recording power and an erasing power being used in a manner such that a ratio between the recording power and the erasing power being used is equal to a predetermined value;

obtaining a recording power corresponding to a predetermined gamma value based on results of the test writing; and obtaining the optimum recording power by multiplying the obtained recording power by a predetermined coefficient.

5. A power determining method for determining a light emitting power of a light source upon recording information on an optical disk having a plurality of rewritable recording layers, the method comprising a step of:

obtaining an optimum erasing power with respect to an optimum recording power by recording test data on the optical disk, wherein the step of obtaining the optimum erasing power includes recording the test data on at least one of the recording layers other than a furthest recording layer of the recording layers which at least one is positioned furthest from a plane of incidence on which light from the light source is incident.

6. A recording method for recording information on an optical disk having a plurality of rewritable recording layers, the recording method comprising a step of:

recording the information on the optical disk using an optimum erasing power obtained by a power determining method according to claim 1.

7. A computer program product including a non-transitory computer-readable medium storing a computer-executable program executed by a control computer of an optical disk apparatus configured to record information on an optical disk having a plurality of rewritable recording layers, the program being executed by the control computer to perform a step of:

obtaining an optimum erasing power with respect to an optimum recording power by recording test data on the optical disk, wherein the step of obtaining the optimum erasing power includes erasing the test data using differing erasing powers after recording the test data on the optical disk using the optimum recording power, and obtaining the optimum erasing power based on an amplitude of a signal obtained from an area of the optical disk from which the test data are erased, and wherein the optimum erasing power is equal to an erasing power used when the amplitude of the signal obtained from the area from which the test data are erased establishes a predetermined relationship with an amplitude of a signal obtained from an unrecorded area of the optical disk.

8. A non-transitory computer-readable medium storing a computer-executable program executed by a control computer of an optical disk apparatus configured to record information on an optical disk having a plurality of rewritable recording layers, the program being executed by the control computer to perform a step of:

obtaining an optimum erasing power with respect to an optimum recording power by recording test data on the optical disk, wherein the step of obtaining the optimum erasing power includes erasing the test data using differing erasing powers after recording the test data on the optical disk using the optimum recording power, and obtaining the optimum erasing power based on an amplitude of a signal obtained from an area of the optical disk from which the test data are erased, and wherein the optimum erasing power is equal to an erasing power used when the amplitude of the signal obtained from the area from which the test data are erased establishes a predetermined relationship with an amplitude of a signal obtained from an unrecorded area of the optical disk.

9. An optical disk apparatus configured to record information on an optical disk having a plurality of rewritable recording layers, the apparatus comprising:

an optimum power obtaining unit configured to record test data on the optical disk and obtain an optimum erasing power with respect to an optimum recording power; and a recording unit configured to record information on the optical disk using the optimum erasing power obtained by the optimum power obtaining unit, wherein the optimum power obtaining unit is configured to obtain the optimum erasing power by erasing the test data using differing erasing powers after recording the test data on the optical disk using the optimum recording power, and obtaining the optimum erasing power based on an amplitude of a signal obtained from an area of the optical disk from which the test data are erased, and wherein the optimum erasing power is equal to an erasing power used when the amplitude of the signal obtained from the area from which the test data are erased establishes a predetermined relationship with an amplitude of a signal obtained from an unrecorded area of the optical disk.

10. A single sided multilayer optical disk, comprising:

a plurality of rewritable recording layers, wherein setting value information is preformatted in at least one of the recording layers, and wherein said plurality of rewritable recording layers are configured to have information recorded thereon by receiving light emitted from a light source having a light emitting power determined by a power determining method, the method comprising:

obtaining an optimum erasing power with respect to an optimum recording power by recording test data on the optical disk, wherein the setting value information is used for obtaining the optimum erasing power, wherein the step of obtaining the optimum erasing power includes erasing the test data using differing erasing powers after recording the test data on the optical disk using the optimum recording power, and obtaining the optimum erasing power based on an amplitude of a signal obtained from an area of the optical disk from which the test data are erased, and wherein the optimum erasing power is equal to an erasing power used when the amplitude of the signal obtained from the area from which the test data are erased establishes a predetermined relationship with an amplitude of a signal obtained from an unrecorded area of the optical disk.

11. The single-sided multilayer optical disk as claimed in claim 10, wherein the setting value information is preformatted in at least one of a lead-in area and a lead-out area of said at least one of the recording layers.

* * * * *